United States Patent [19]
Nambu

[11] Patent Number: 5,444,749
[45] Date of Patent: Aug. 22, 1995

[54] APPARATUS FOR COLLECTING AN ARTICLE

[75] Inventor: Kunio Nambu, Kyoto, Japan

[73] Assignee: Nambu Electric Co., Ltd., Kyoto, Japan

[21] Appl. No.: 206,394

[22] Filed: Mar. 7, 1994

Related U.S. Application Data

[62] Division of Ser. No. 862,573, Jun. 26, 1992, Pat. No. 5,319,160.

[30] Foreign Application Priority Data

| Dec. 14, 1990 | [JP] | Japan | 2-410902 |
| Dec. 20, 1990 | [JP] | Japan | 2-413486 |
| Mar. 7, 1991 | [JP] | Japan | 3-69253 |
| Apr. 9, 1991 | [JP] | Japan | 3-104818 |
| Apr. 10, 1991 | [JP] | Japan | 3-106628 |
| Apr. 17, 1991 | [JP] | Japan | 3-114060 |
| May 2, 1991 | [JP] | Japan | 3-130509 |
| Dec. 4, 1991 | [JP] | Japan | 3-348843 |

[51] Int. Cl.⁶ .......... G01G 13/00; G06M 7/00; B65H 3/28; G06F 15/20
[52] U.S. Cl. .......... 377/6; 177/25.18; 177/83; 221/8; 414/901; 209/551; 364/478; 364/479
[58] Field of Search .......... 177/25.18, 70, 83; 364/567, 478, 479; 377/6; 221/8; 414/901; 209/551

[56] References Cited
U.S. PATENT DOCUMENTS

| 4,247,019 | 1/1981 | Lerner | 222/77 X |
| 4,522,274 | 6/1985 | Konishi et al. | 177/70 X |
| 4,529,049 | 7/1985 | Fukuda | 177/25.18 X |
| 4,566,070 | 1/1986 | Tanaka | 364/567 |
| 4,661,917 | 4/1987 | Haze et al. | 364/567 |

Primary Examiner—Benjamin R. Fuller
Assistant Examiner—Randy W. Gibson
Attorney, Agent, or Firm—Nixon & Vanderhye

[57] ABSTRACT

An article collecting device comprising: feed unit 5 for feeding a set of articles smaller in quantity than a target quantity for collection; a recirculating conveyer 2 for conveying a set of articles fed by the feed unit 5; an operation unit 14 for combining at least two sets of articles fed during conveyance of the set of articles by the conveyer and determining whether a target quantity of articles as a preset collection unit is obtained; and an opening unit 12 for discharging the sets of articles combined as the target quantity from the conveyer to a bagging and packaging unit 13 as the result of the combination by the operation unit.

5 Claims, 35 Drawing Sheets

FIG.45

| STORAGE POSITION → | P11 | P10 | P9 | P8 | P7 | P6 | P5 | P4 | P3 | P2 | P1 |
|---|---|---|---|---|---|---|---|---|---|---|---|
| WEIGHT → | 51.4 | | | | | | | | | | |

| | | | | | | | | | | |
|---|---|---|---|---|---|---|---|---|---|---|
| 48.5 | 51.4 | | | | | | | | | |

| | | | | | | | | | | |
|---|---|---|---|---|---|---|---|---|---|---|
| 53.5 | 48.5 | 51.4 | | | | | | | | |
| 1a | 1a | | | | | | | | | |

| | | | | | | | | | | |
|---|---|---|---|---|---|---|---|---|---|---|
| 54.0 | 53.5 | 48.5 | 51.4 | | | | | | | |
| | 1a | | 1a | | | | | | | |

| | | | | | | | | | | |
|---|---|---|---|---|---|---|---|---|---|---|
| 51.3 | 54.0 | 53.5 | 48.5 | 51.4 | | | | | | |
| | | 1a | | 1a | | | | | | |

| | | | | | | | | | | |
|---|---|---|---|---|---|---|---|---|---|---|
| 47.3 | 51.3 | 54.0 | 53.5 | 48.5 | 51.4 | | | | | |
| 2a | | 2a | | 1a | 1a | | | | | |

FIG.46

| POSITION STORAGE → | P11 | P10 | P9 | P8 | P7 | P6 | P5 | P4 | P3 | P2 | P1 |
|---|---|---|---|---|---|---|---|---|---|---|---|
| WEIGHT → | 51.4 | | | | | | | | | | |

| | 48.5 | 51.4 | | | | | | | | | |
|---|---|---|---|---|---|---|---|---|---|---|---|

| | 53.5 | 48.5 | 51.4 | | | | | | | | |
|---|---|---|---|---|---|---|---|---|---|---|---|
| | 1b | | 1b | | | | | | | | |

| | 51.6 | 47.3 | 51.3 | 54.0 | 53.5 | 48.5 | 51.4 | | | | |
|---|---|---|---|---|---|---|---|---|---|---|---|
| | 2b | | 2b | 1c | 1b | 1c | 1b | | | | |

| | 56.0 | 53.9 | 50.4 | 52.2 | 52.2 | 48.5 | 46.9 | 49.4 | 50.5 | 51.6 | 47.3 |
|---|---|---|---|---|---|---|---|---|---|---|---|
| | | 3c | 3c | 3b | 2c | | | 3b | 2c | 2b | |

APPARATUS FOR COLLECTING AN ARTICLE

This is a divisional of application Ser. No. 07/862,573, filed Jun. 26, 1992, U.S. Pat. No. 5,319,160.

TECHNICAL FIELD

The present invention relates to an apparatus for collecting an article, the apparatus obtaining a target number or weight of articles by combining at least two sets of articles, and more particularly an article collecting apparatus which conveys in a recirculating manner sets of articles in number or weight smaller than a predetermined number or weight in a packaging unit required, combines at least two sets of articles during conveyance to obtain a desired number or weight of articles as the packaging unit.

BACKGROUND ART

For example, when small parts such as screws are bagged, the images of articles in required packaging units are picked up by a CCD camera or the like and the number of articles is counted and packaged, as disclosed in published unexamined Japanese patent application Hei 2-59888.

However, according to this prior art, since after the number of articles as the packaging unit is counted, the feeding operation of the article feed unit is stopped for packaging purpose, there is a probability that articles fed by the article feed unit will be packaged even after the predetermined number of articles is counted. In order to prevent such situation, after articles close in number to the packaging unit are counted, one or a few of articles are required to be fed until the final packaging unit is reached.

According to the present invention, sets of articles smaller in number than the packaging unit are conveyed in a recirculating manner and a combination of sets of articles is performed to collect articles at a discharge position on the conveyance passageway to package articles in the required packaging units to eliminate a time for fine adjustment of feeding articles in units of one or a few articles after articles of a number close to the packaging unit are counted in order to obtain articles of a required packaging unit.

The present invention is intended to temporarily accommodate the collected articles to successively obtain articles in a required packaging unit.

The present invention is intended to feed any quantity of articles less than a packaging unit, perform a combination of uneven quantities of already accommodated articles and the fed number of articles to provide a required target quantity of articles. Even if a combination of ones of the plurality of discharge means is obtained, the articles are discharged at the same discharge position in order to reduce the collection time.

The conventional device catches falling small articles using CCD cameras for counting purposes. In that case, some of the falling articles fall in overlapping relationship and are counted as one, which is a problem in the packaging of articles which requires accuracy.

The present invention is intended to count the correct number of feed articles by scattering the articles.

The present invention scatters the fed articles and counts the articles before and after the scattering to obtain a more accurate number of articles.

In order to obtain a target weight of articles from sets of articles each set being different in weight from another set, there is a measuring device which measures the respective weights of sets of articles fed to measuring hoppers, combines and adds any two of sets of articles different in measured value to obtain a set of articles of a predetermined weight or close to same.

In order to measure a weight of articles close to a target weight to provide a required target weight of articles, the present invention is intended to eliminate a time for fine adjustment of feeding articles in units of one or several articles. In order to collect articles such as small screws, nails, granular or powder-like medicine, pet foods or sets of uneven articles to provide a required target weight of articles, the present invention measures any individual quantities of sets of articles less in weight than a target weight, conveys in a recirculating manner the respective measured sets of articles as a unit, performs a combining operation on any sets of articles, collects satisfactory combined sets of articles at a discharge position on the conveyance way to successively obtain sets of articles in required units of packaging.

DISCLOSURE OF THE INVENTION

The present invention provides an article collecting device comprising: feed means for feeding a set of articles smaller in total quantity than a target quantity for collection; conveyance means for conveying sets of articles fed by said feed means; determining means for combining at least two sets of articles fed during the time when the sets of articles are conveyed by said conveyance means and determining whether a target quantity of articles as a preset collection unit is obtained; and discharge means for discharging the sets of articles combined as the target quantity from said conveyance means to collection means as the result of the combination by the determining means.

The present invention also provides an article collecting device comprising: feed means for feeding a set of articles smaller in total quantity than a target one; means for sequentially measuring the quantities of the sets of articles fed by said feed means; means for storing the measured quantities of sets of articles; and a plurality of discharge means for accommodating the measured sets of articles and discharging the accommodated sets of articles in accordance with a discharge instruction, wherein the device determines whether a combination of a fed set of articles and another set of articles already accommodated brings about a target quantity of articles, determines the discharge of the combined sets of articles if the combined sets of articles amount to the target quantity, and moves said discharge means to receive a new set of articles to obtain the target quantity of articles when the combined sets of articles do not amount to the target quantity.

The present invention further provides an article collecting device comprising: a standby hopper for temporarily detaining a known quantity of articles indefinite in quantity and smaller in quantity than a target quantity for collection; a plurality of receivers provided on the same circumference; a turning unit for turning the receivers to dispose the respective receivers successively at a position where the hopper discharges the articles; tracing means for tracing the current positions of the sets of articles accommodated in the corresponding receivers together with information on the respective quantities of sets of articles in correspondence to the respective moves of the receivers; operation means for combining at least two sets of articles accommodated in the receivers to obtain a target quantity of articles; discharge means provided above a plane where the receivers turn to discharge from the receivers the combined sets of articles equal in quantity to the target quantity as the result of the combination by the operation means; and discharge means provided above the plane where the receivers turn to discharge from the receiver the combined sets of articles which do not satisfy the target quantity during turning of the receivers.

The present invention further provides a small article counting device comprising: feed means for dropping a plurality of small articles; scattering means positioned below a discharge end of said feed means for hindering the fall of the articles and scattering the articles in the passageway for the articles falling from the discharge end; and detecting means for detecting the articles which are scattered by said scattering means to fall to thereby count the number of falling articles.

The present invention also provides a small article counting device which sequentially feeds a set of small articles indefinite in number and smaller in number than a target number, conveys the fed sets of articles in units of a set in a recirculating manner, combines at least two sets of articles during recirculating conveyance of the articles after the feeding of the articles to thereby obtain the target quantity of small articles, said device comprising feed means for feeding a set of small articles indefinite in number and smaller in number than the target number; scattering means positioned below a discharge end of said feed means for hindering the fall of the articles and scattering the articles in a passageway for the articles falling from the discharge end; and detection means for detecting the articles which are scattered by said scattering means to fall to thereby count the number of falling articles.

In addition, the present invention provides a small article counting device comprising: feed means for feeding a plurality of small articles; scattering means positioned below a feed port of said feed means in the passageway for fall of the articles which fall from the feed port for hindering the fall of the articles and scattering the articles; detection means for detecting articles which fall through the passageway for fall of the articles; and detection regions for said detection means provided above and below said scattering means to thereby count again the number of articles which fall through said detection region below said scattering means.

The present invention further provides a small article counting device comprising: feed means for dropping a plurality of small articles; scattering means positioned below a discharge end of said feed means in the passageway for fall of the articles which fall from the discharge end for hindering the fall of the articles and scattering the articles; detection means for detecting articles which fall through the passageway for fall of the articles; detection regions for said detection means provided above and below said scattering means; and determining means for comparing the quantity of articles detected in the detection region above said scattering means and the quantity of articles detected in the detection region below said scattering means to determine whether the set of articles which have fallen should be packaged or not.

In one example of the determining means in the present invention, when the number of articles counted in the detection region above said scattering means provided in the passageway for fall of the articles for hindering the fall of the articles and scattering the articles differs from the number of articles counted in the detection region below said scattering means, the determining means nullifies the counted number of the articles.

In another example of the determining means, when the quantity of articles counted in the detection region above said scattering means provided in the passage of fall of the articles for hindering the fall of the articles and scattering them differs from the quantity of articles counted in the detection region below said scattering means, and when the largest one of the counted quantities is the same as a predetermined quantity, the determining means determines that the set of counted articles should be packaged.

The present invention further provides a small article counting device which sequentially feeds sets of small articles indefinite in number and smaller In number than a target number, conveys the fed sets of articles in units of a set in a recirculating manner, combines at least two sets of articles during recirculating conveyance of the articles after the feeding of the articles to thereby obtain the target number of small articles, said device comprising feed means for feeding a set of small articles in definite in number and smaller in number than the target number; scattering means positioned below a discharge end of said feed means in a passageway for the articles falling from the discharge end for hindering the fall of the articles and scattering the articles; detection means for detecting the articles which fall through the passageway for the articles; and detection regions for said detection means provided above and below said scattering means to thereby again count the number of articles which fall through the detection region below said scattering means.

Also, the present invention provides a small article counting device which sequentially feeds sets of small articles indefinite in number and smaller in number than a target number, conveys the fed sets of articles in units of a set in a recirculating manner, combines at least two sets of articles during recirculating conveyance of the articles after the feeding of the articles to thereby obtain the target quantity of small articles, said device comprising feed means for feeding a set of small articles indefinite in number and smaller in number than the target number; scattering means positioned below a discharge end of said feed means for hindering the fall of the articles and scattering the articles in a passageway for the articles falling from the discharge end; detection means for detecting the articles which fall through the passageway for the articles; detection regions for said detection means provided above and below said scattering means; and determining means for comparing the number of articles detected in the detection region above said scattering means and the number of articles detected in the detection region below said scattering means to determine the number of articles which have fallen.

In one example of such small article counting device, when the number of articles counted in the detection region above said scattering means provided in the passageway of fall of the articles differs from the number of articles counted in the detection region below said scattering means, said determining means determines that the largest one of the counted number is the number of articles which have fallen.

The present invention proposes a constant-quantity-of-articles collecting device comprising feed means for feeding a set of articles less in total quantity than a target quantity; distributing means for conveying in a recirculating manner in units of a fed quantity the respective sets of articles fed by said feed means and selectively distributing the respective sets of articles on the conveyance way; tracing means for tracing the respective current positions of sets of articles of the quantity fed by said feed means together with information on the respective quantities of the sets of articles in correspondence to the move of said distributing means; operation means for combining at least two of the sets of articles to obtain the target quantity of articles as a preset collection unit; discharge means for discharging the combined sets of articles whose total quantity is the target quantity from said distributing means as the result of combination by the operation means; and accommodation means for temporarily accommodating the combined sets of articles whose total quantity is the target quantity discharged by said discharge means.

In addition, the present invention provides a constant-weight-of-articles collecting device comprising feed means for feeding a set of articles less in total weight than a target quantity; setting means for setting a target weight for collection and an allowance for the target weight; distributing means for conveying in a recirculating manner in units of a fed quantity the respective sets of articles fed by said feed means and selectively discharging the respective sets of articles on the conveyance way; tracing means for tracing the respective current positions of the sets of articles of the quantity fed by said feed means together with information on the respective quantities of the sets of articles in correspondence to the move of said distributing means; operation means for combining at least two of the sets of articles to obtain the target quantity of articles as a preset collection unit set by said setting means; discharge means for discharging the combined sets of articles whose total quantity is the target quantity from said distributing means on the basis of the current positions of the combined sets of articles as the result of combination by the operation means; and control means for outputting a feed instruction to said feed means to feed articles to an empty position of said distributing means corresponding to information on the absence of articles on the basis of information on the current positions of the sets of articles from said tracing means.

When the control means outputs a feed instruction to the feed means to feed articles at the position where the distributing means is empty in such a constant-weight-of-articles collecting device, the collecting device may calculate deficiencies, from the target weight, of the respective weights of sets of articles carried by the distributing means and not yet combined so as to obtain the target weight and control the feed means so as to feed these deficiencies of the weights of articles to the empty position.

The articles handled in the present invention include small articles such as screws or nails, granular or powder-like medicine or articles such as pet foods, articles such as cake, fruit or vegetables or other articles different in shape.

The sets of articles in the present invention each also includes a single article.

The present invention will be described in more detail on its embodiments shown in the drawings. Thus, these and other objects and features of the present invention will be clarified much more. It is to be noted that the present invention is not limited to these embodiments.

BRIEF DESCRIPTION OF THE DRAWINGS

FIG. 45 illustrates a combining operation of a control unit shown in FIG. 44 and involving storage positions.

FIG. 46 illustrates a combining operation of the control unit shown in FIG. 44 and involving storage positions in another embodiment.

EMBODIMENTS

Figure 1:
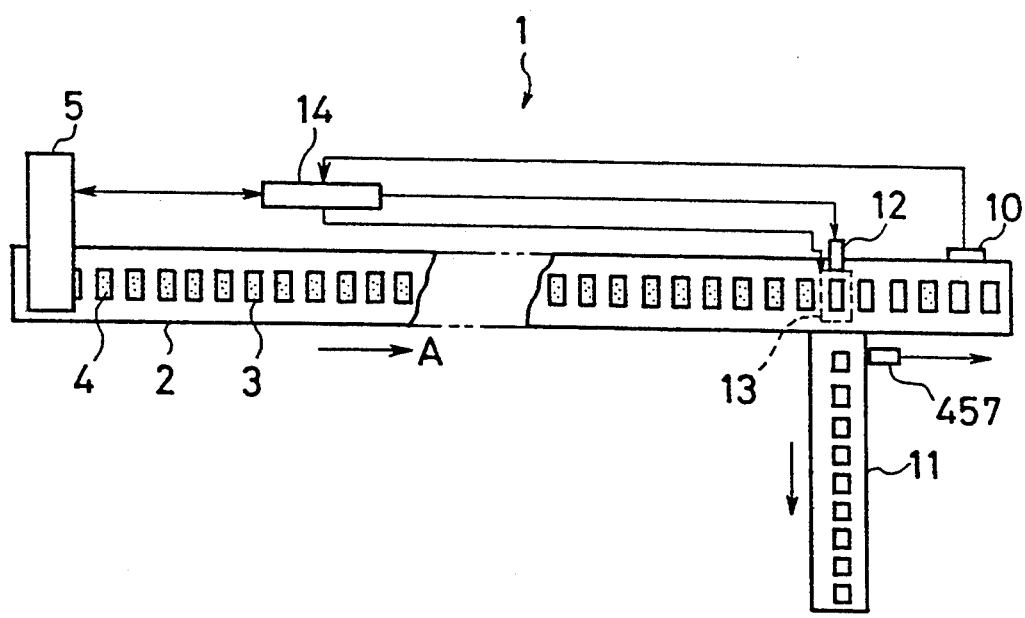
FIG. 1 is a plan view of a preferred embodiment of the present invention.
Figure 2:
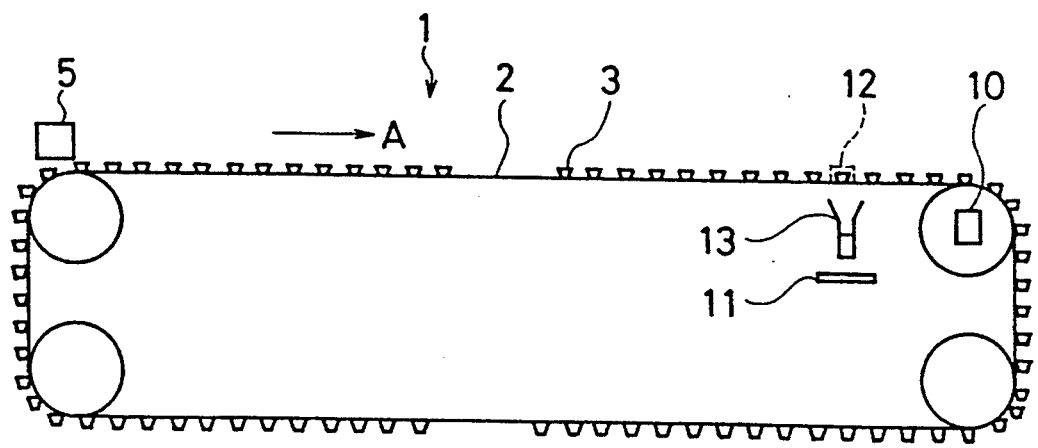
FIG. 2 is a schematic side view of the embodiment shown in FIG. 1.

In a constant-number-of-small-articles collecting device 1 of this embodiment, as shown in FIGS. 1 and 2, a conveyer 2 with many successive article receivers 3 thereon as distribution means is conveyed in a recirculating manner with a number of small articles 4 in each receiver as a unit.

Figure 3:
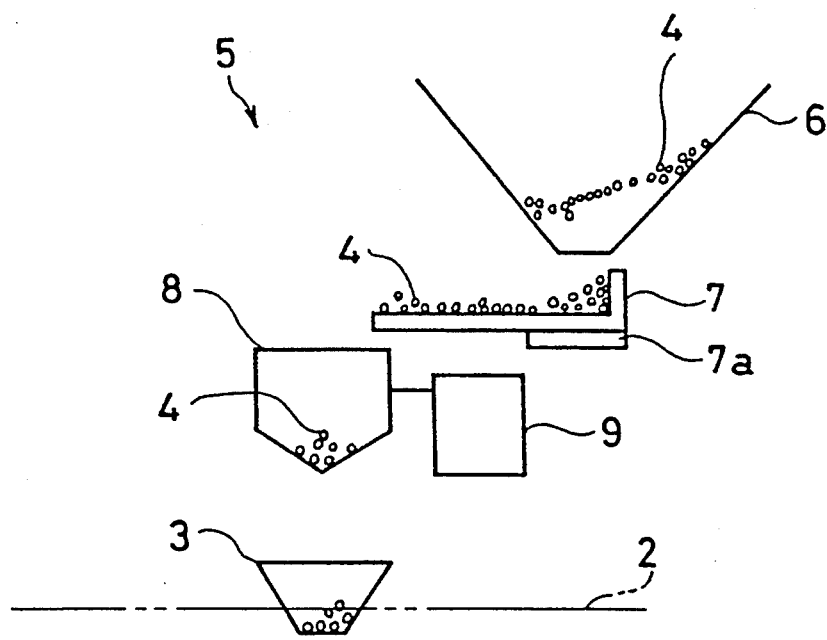
FIG. 3 is a side view of a part feed unit of the embodiment of FIG. 1.

A part feed unit 5 provided at an upstream end of the conveyer 2 feeds parts 4 smaller in number than a predetermined number of parts collected. As shown in FIG. 3, it includes a feed shoot 6, a loosening shoot 7 which moves the parts 4 fed by the feed shoot 6 while vibrating and loosing the parts, a feed hopper 8 which receives parts 4 falling from an end of the shoot 7 and then feeds the parts into a part receiver 3 on the recirculating conveyer 2 for counting purposes, and a weight meter 9 which measures the total weight of the parts 4 in the hopper 8.

An encoder 10 as tracing means attached to a drive shaft (not shown) of the conveyer 2 detects the conveyance speed of the conveyer 2. The respective positions of the part receivers 3 are confirmed by the corresponding speed signals from the encoder 10.

An opening unit 12 as discharge means is provided downstream and laterally of the conveyer 2 at a position where the conveyer 2 intersects with an underlying gathering conveyer 11 extending in a direction perpendicular to the direction of arrow A in which the recirculating conveyer 2 is moved. The opening unit opens the bottom of a part receiver 3 in response to an opening signal to thereby discharge parts 4 in the receiver 3. A bagging and packaging unit 13 is provided below the recirculating conveyer 2 in order to receive parts 4 discharged from the receiver 3 and to bag a number of parts 4 as a unit of collection.

An operation unit 14 is provided in the vicinity of the recirculating conveyer 2 as determining means which combines at least two units of parts 4 in the corresponding receivers 3 and determines whether a number of parts as a preset collection unit is obtained during movement of the parts 4 by the circulating conveyer 2.

Figure 4:
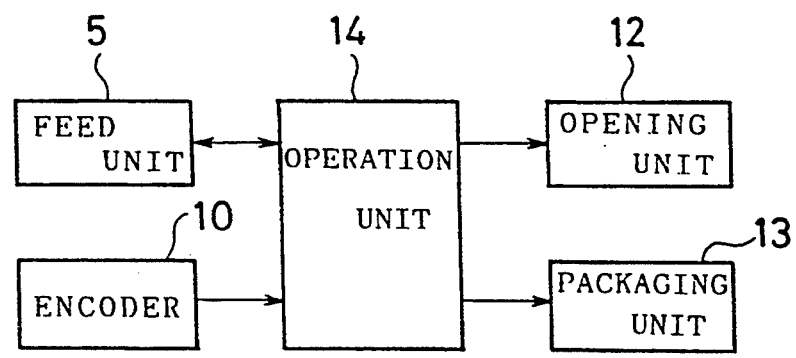
FIG. 4 is a block diagram of an electric system of the embodiment of FIG. 1.

In addition, the operation unit 14 has the function described below, as shown in FIG. 4. It receives from the weight meter 9 a signal indicative of the total weight of parts fed into the hopper 8 and measured by the meter and calculates the number of parts 4 fed into the receiver 3 on the basis of the weight of a single part stored beforehand in the operation unit 14. The number of parts 4 in the receiver 3 thus calculated is stored in the operation unit 14 in correspondence to that receiver 3.

The operation unit 14 successively grasps the respective positions of the part receivers 3 on the basis of signals indicative of the speeds of the recirculating conveyer 2 from the encoder 10 and determines which part receiver 3 is at a position where that receiver 3 faces the opening unit 12. When a part receiver 3 to be opened at the bagging and packaging unit 13 is determined as the result of combination performed by the operation unit 14, an opening signal is output from the operation unit 14 each time the determined part receiver 3 is conveyed to a position beside the opening unit 12. Each time the number of parts 4 discharged to the bagging and packaging unit 13 reaches a value as a preset unit of collection, that is, each time a combination of part receivers 3 is released, a packaging signal is output from the operation unit 14 to the bagging and packaging unit 13. Thus, in response to such packaging signal, the mouth of a bag, for example, made of vinyl is closed.

The operation of the constant-number-of-small articles collecting apparatus 1 having the above structure will be described hereinafter. Parts 4 fed from the feed shoot 6 of the part feed unit 5 to the loosening shoot 7 are gradually loosened by the vibrations of the loosening shoot 7 driven by a vibration driver 7a while falling into the feed hopper 8. The total weight of the parts 4 falling sequentially into the feed hopper 8 is measured by the meter 9 and a signal indicative of the measured weight is fed to the operation unit 14 each time such measurement is made. The weight of a single part is beforehand stored in the operation unit 14. The number of parts 4 fed Into the feed hopper 8 is calculated on the basis of the weight of the single part.

In the present embodiment, the collection unit of parts 4 is 10 parts. Sets of about 5 parts which is about half of the collection unit and uneven in the number of parts from set to set are fed to respective receivers 3. Thus, about 5 parts 4 are received in each of the part receivers 3 provided successively on the recirculating conveyer 2. Since the recirculating conveyer 2 is conveyed in the direction of arrow A, sets of parts 4 are sequentially fed into the respective part receivers 3 arriving at a position below the part feed unit 5. The part receivers 3 receive respective sets of parts 4 uneven in the number of parts from set to set, and the respective current positions of the receivers 3 are grasped at all times on the basis of signals indicative of the conveyance speeds from the encoder 10 provided on the drive shaft of the recirculating conveyer 2.

While the respective part receivers 3 move from the position where they receive the parts 4 to the position of the opening unit 12 where the respective bottoms of the part receivers 3 are opened, some receivers 3 are combined by the operation unit 14 to obtain a predetermined number of parts as a predetermined collection unit for bagging purposes.

When each of the part receivers 3 determined to be combined arrives at the position of the opening unit 12, the parts 4 in that receiver 3 are discharged into the bagging and packaging unit 13 provided below the recirculating conveyor 2 by an opening signal from the operation unit 14. When parts 4 are discharged from the combined two part receivers 3, a packaging signal is output from the operation unit 14 to the bagging and packaging unit 13 to thereby seal up the bag and the resulting bags are collected by the gathering conveyer 11 to the same position.

Figure 5:
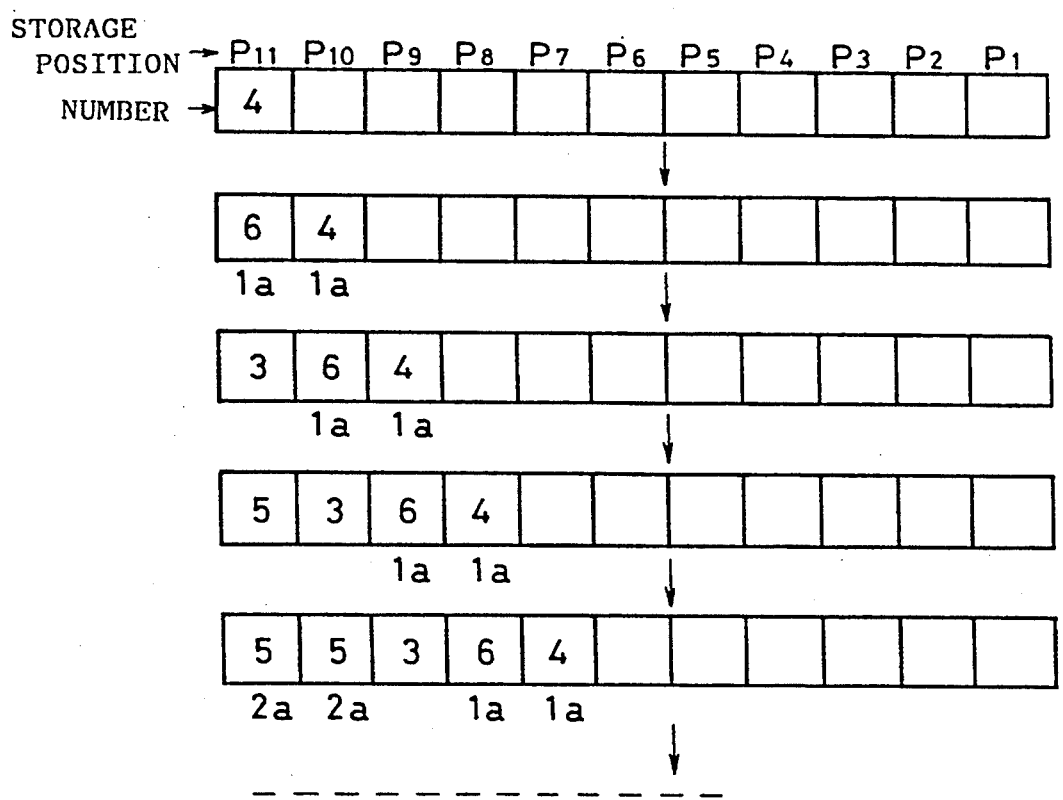
FIG. 5 illustrates a combination performed by an operation unit of the embodiment of FIG. 1.

A specified combining operation will be described next. Storage positions for the combining operation stored in the operation unit 14 are shown in FIG. 5. The numbers of parts received in the receivers 3 and the sequence of conveyance of the receivers 3 will be described below with respect to Table 1.

Eleven storage positions P1–P11 are set in the operation unit 14. When sequentially counted, the respective stored data on the respective numbers of parts of the sets are shifted sequentially from P11 to P10, from P10 to P9 and so on, on the basis of the conveyance signals from the encoder 10. Each time such a shift is made, the number of parts which have been input to P11 and the number of parts already counted so far and stored at any one of the storage positions P10 to P1 are combined and it is determined whether the total number of the combined parts amounts to 10 as the collection unit.

First, when parts 4 are fed to a receiver 3, the operation unit 14 calculates how many parts are fed. For example, 4 in the first of the counting sequence is stored at P11 from Table 1. Since no data are stored at positions P10-P1, no combining operation is performed.

Four (parts) at the storage position P11 is shifted to the storage position P10 and 6 (parts) in the second counting sequence is stored at position P11. It is then determined whether the sum of 6 (parts) at position P11 and 4 (parts) at position P10 becomes 10 (parts) as a collection unit. Since the result of the combination is 10 (parts), the combination of 4 (parts) in the first counting sequence and 6 (parts) in the second counting sequence is determined as a first combination 1a.

The number of 4 (parts) stored at storage position P10 is then shifted to storage position P9 and 6 (parts) at storage position P11 is shifted to the empty storage position P10. The number of 3 (parts) in the third counting sequence is stored at the empty storage position P11. Thereafter, it is determined whether 3 (parts) stored at the storage position P11 and another number are combined to become 10 (parts), but since the storage positions P10 and P9 are determined already as being combined, no combining operation on them is performed.

TABLE 1

| Counting sequence | (1) | (2) | (3) | (4) | (5) |
|---|---|---|---|---|---|
| Number of parts | 4 | 6 | 3 | 5 | 5 |
| Comb. sequence | 1a | 1a | | 2a | 1a |
| Counting sequence | (6) | (7) | (8) | (9) | (10) |
| Number of parts | 3 | 7 | 4 | 6 | 6 |
| Comb. sequence | 3a | 3a | 4a | 4a | 5a |
| Counting sequence | (11) | (12) | (13) | (14) | (15) |
| Number of parts | 4 | 5 | 7 | 4 | 5 |
| Comb. sequence | 5a | 6a | | | 6a |
| Counting sequence | (16) | (17) | (18) | (19) | (20) |
| Number of counts | 6 | 3 | 4 | 2 | 5 |
| Comb. sequence | 7a | | 7a | | |

Then, 4 (parts) storage position P9 is shifted to P8; 6 (parts) at P10 to P9; 3 (parts) at P11 to P10; and 5 (parts) is input to the emptied storage position P11. Although a combination of 5 (parts) at P11 and 3 (parts) at P10 is performed, the sum of these numbers does not amount to 10 (parts) as the collection unit. Thus, it is determined that there are no combinations this time.

After the respective numbers stored at storage positions P11-P9 are shifted, 5 (parts) in the fifth counting sequence is input to storage position P11, as shown in Table 1. A combination of 5 (parts) at P11 and 3 (parts) at P9 which is not yet determined as being combined is performed, but the result does not satisfy the collection unit. Thus, a combination of 5 (parts) at P11 and 5 (parts) at P10 is performed. As a result, 5 (parts) in the fourth counting sequence and 5 (parts) in the fifth counting sequence are determined as a combination 2a. In this way, the respective combinations are determined. The results are entered in the columns of combination sequence in Table 1.

Figure 6:
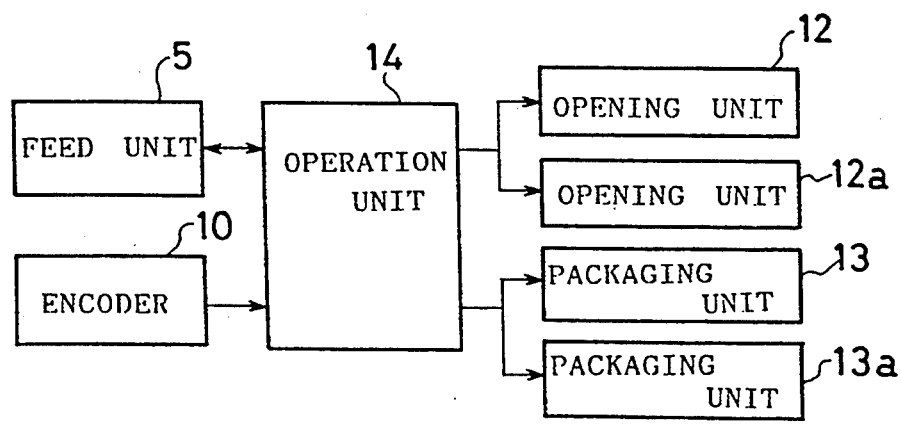
FIG. 6 is a block diagram of an electric system of another preferred embodiment of the present invention.

As another embodiment, two bagging and packaging positions may be provided to carry out more efficient packaging of a predetermined number of parts, as shown in FIG. 6. More specifically, two opening units 12 and 12a, and two bagging and packaging units 13 and 13a are provided and two gathering conveyers 11 are provided accordingly.

Figure 7:
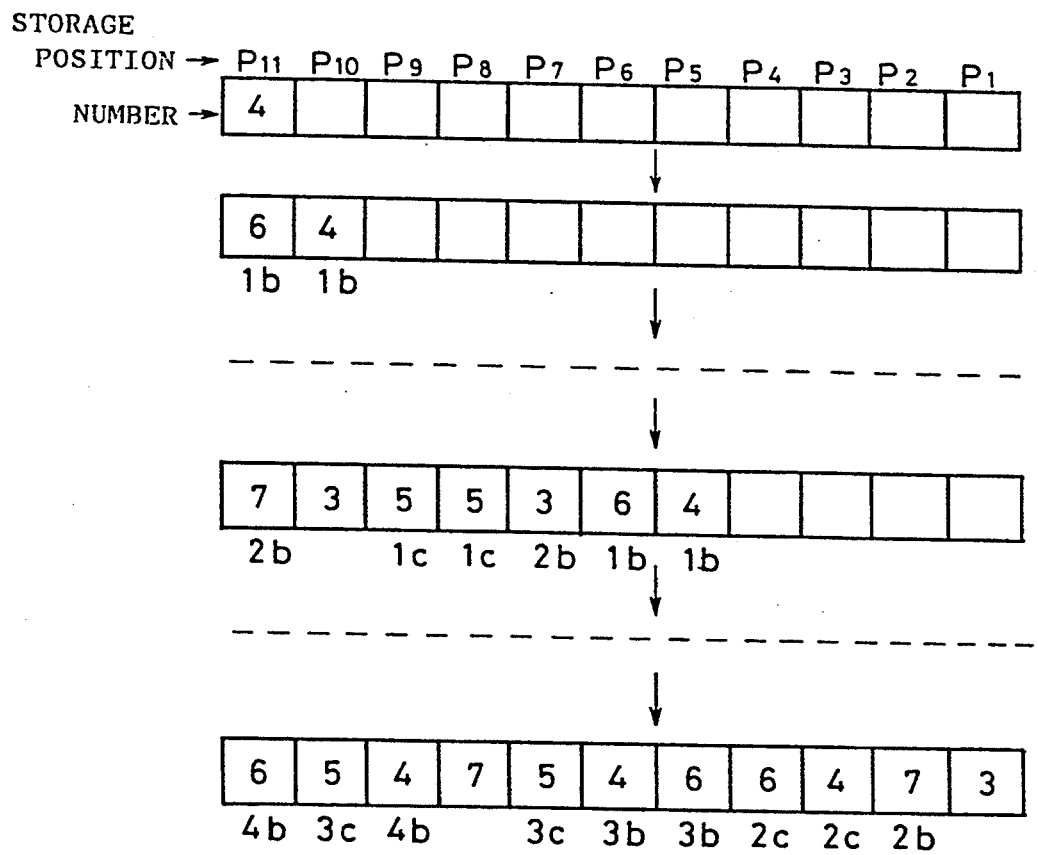
FIG. 7 illustrates a combination performed by an operation unit of the embodiment of FIG. 6.

Table 2 and FIG. 7 show the results of such combining operations and the states of storage positions P11-P1 in the operation unit 14. In the present embodiment, 4 (parts) in the first counting sequence and 6 (parts) in the second counting sequence are determined as being discharged as a combination 1b to one gathering conveyer 11 while 5 (parts) in the fourth counting sequence and 5 (parts) in the fifth counting sequence are determined as being discharged as a combination 1c to the other gathering conveyer 11. Since the combinations 1b and 1c are different in discharge position, 7 (parts) in the seventh counting sequence input to storage position P11, as shown in FIG. 7 and 3 (parts) in the third counting sequence stored at storage position P7 are combined, and as a result, they are discharged as a combination 2b to one gathering conveyer 11.

TABLE 2

| Counting sequence | (1) | (2) | (3) | (4) | (5) |
|---|---|---|---|---|---|
| Number of parts | 4 | 6 | 3 | 5 | 5 |
| Comb. sequence | 1b | 1b | 2b | 1c | 1c |
| Counting sequence | (6) | (7) | (8) | (9) | (10) |
| Number of parts | 3 | 7 | 4 | 6 | 6 |
| Comb. sequence | | 2b | 2c | 2c | 3b |
| Counting sequence | (11) | (12) | (13) | (14) | (15) |
| Number of parts | 4 | 5 | 7 | 4 | 5 |
| Comb. sequence | 3b | 3c | | 4b | 3c |
| Counting sequence | (16) | (17) | (18) | (19) | (20) |
| Number of counts | 6 | 3 | 4 | 2 | 5 |
| Comb. sequence | 4b | | | | |

Figure 8:
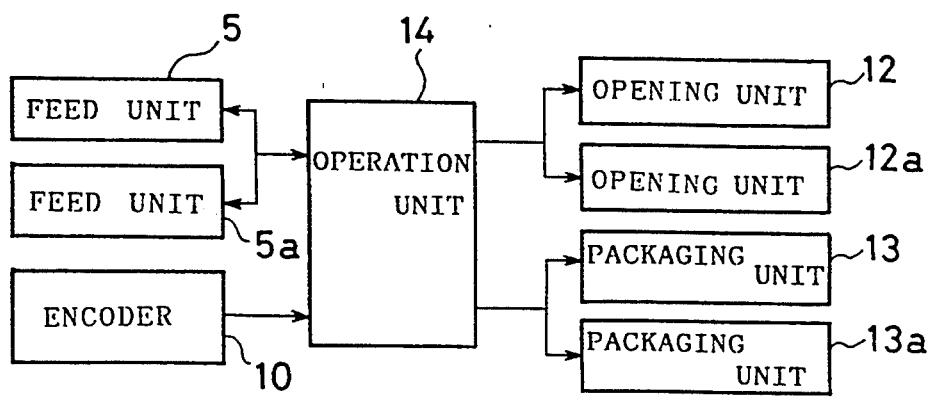
FIG. 8 is block diagram of an electric system of a further preferred embodiment of the present invention.

As shown in FIG. 8, two part feed units 5 and 5a may be provided at corresponding positions where parts 4 are fed into part receivers 3 and two places may be provided where the corresponding combinations of sets of parts are discharged. In this way, a plurality of collection units may be provided. For example, if the collection units is 20 or 30 parts, 20 or 30 parts are bagged by feeding parts in units of about 10 parts into each of part receivers 3. By feeding about 15 parts into each of receivers 3, bags of 30 parts are obtained. Alternatively, sets of parts uneven in the number of parts from set to set with the number of parts of each set being about 1/N (N=3, 4, 5 . . .) of a required collection unit may be fed into part receivers 3.

Alternatively, in order to bag 10 parts the number of which is close to, but less than, 10 may be fed by the feed unit 5 while a few parts may be fed by the feed unit 5a.

Figure 9:
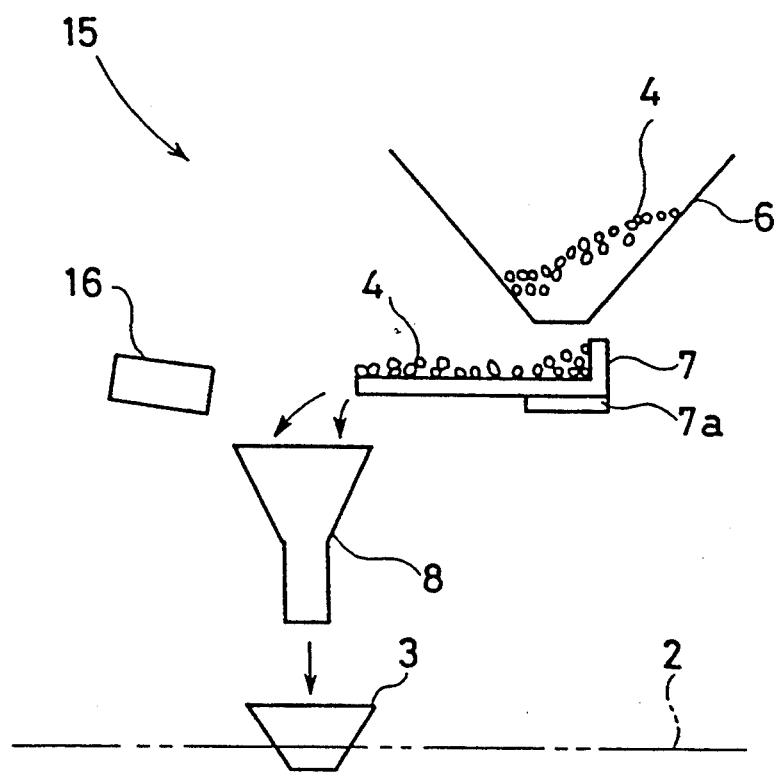
FIG. 9 is a side view of another embodiment of a part feed unit in the present invention.
Figure 10:
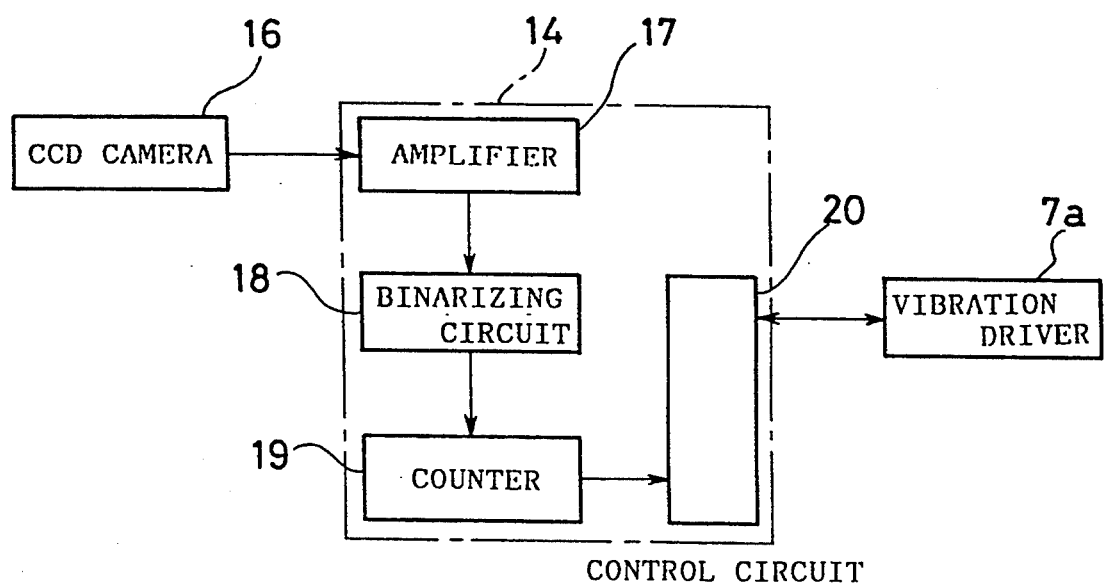
FIG. 10 is a block diagram of a partly detailed electrical system of the operation unit.

The feed unit 15 shown in FIG. 9 has a CCD camera 16 provided in place of the measuring unit to count parts 4 fed from the discharge end of the loosening shoot 7 to a receiver 3. In this case, the number of parts 4 is input to the operation unit 14. That is, as shown in FIG. 10, image pickup output signals from the CCD camera 16 are delivered to the operation unit 14, which counts the number of parts fed. More particularly, the image pickup output signals are amplified by an amplifier 17 and then delivered to a binarizing circuit 18. The binarized image pickup signals for parts 4 are counted by a counter 19 and then delivered to a control circuit 20. When the number of parts counted by the counter 19 amounts to a required number, the control circuit 20 delivers a vibration stopping signal to the vibration driver 7a.

Figure 11:
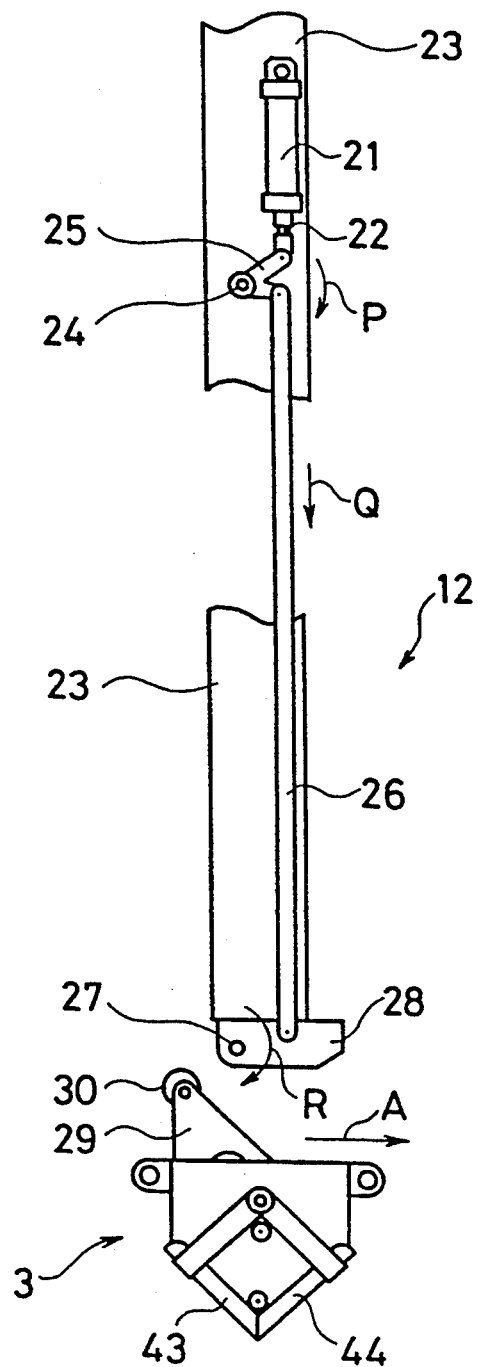
FIG. 11 is a detailed side view of one embodiment of the opening unit in the present invention.
Figure 12:
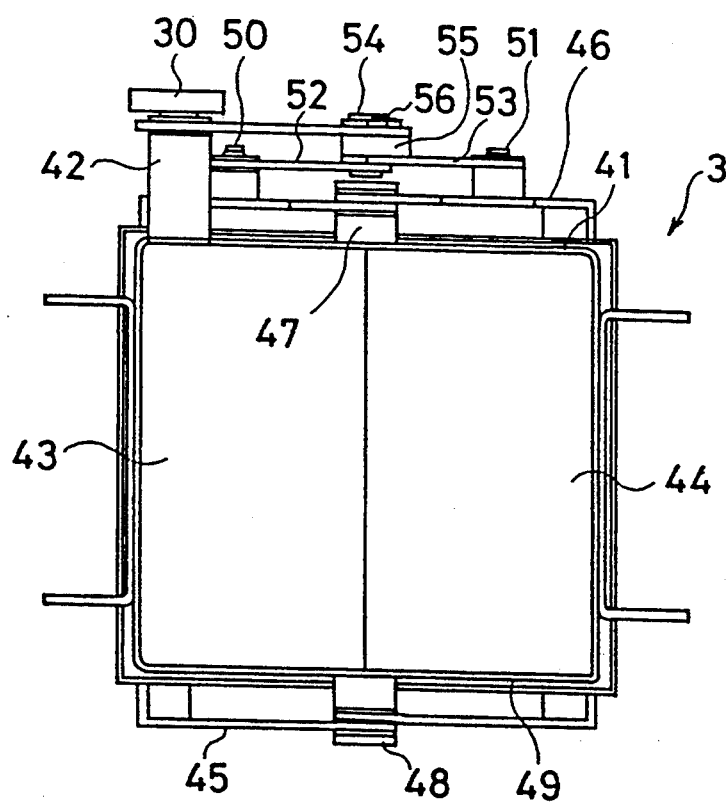
FIG. 12 is a plan view of a receiver shown in FIG. 11.
Figure 13:
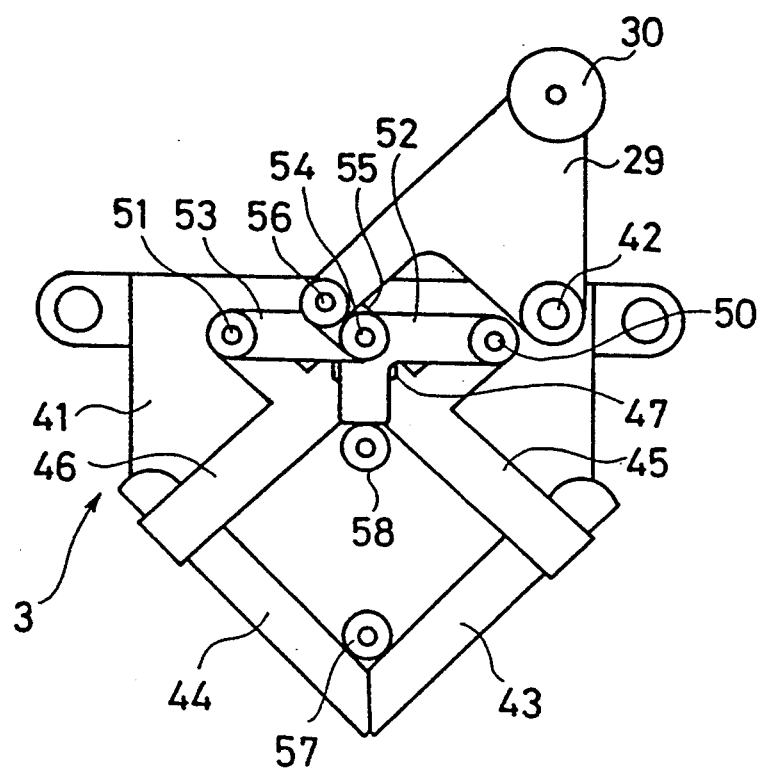
FIG. 13 is a side view of the receiver shown in FIG. 12.
Figure 14:
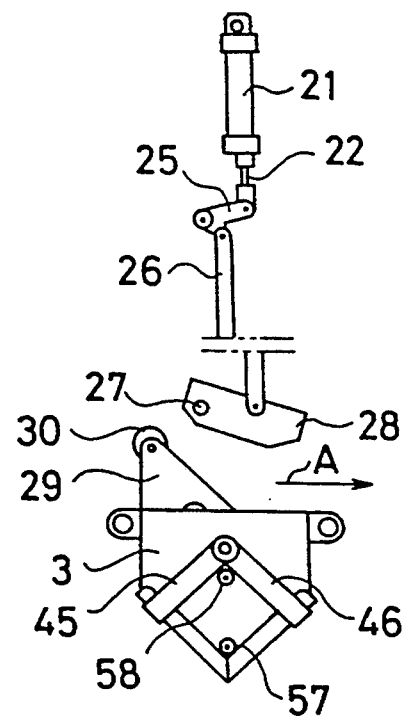
FIG. 14 illustrates the operation of the opening unit shown in FIG. 11.
Figure 15:
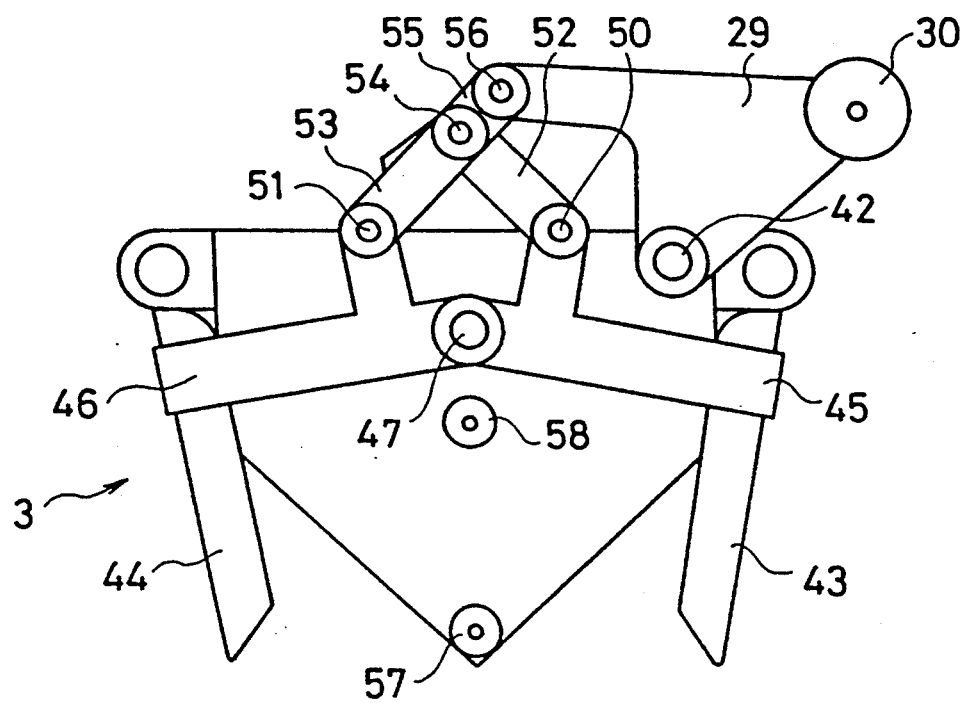
FIG. 15 illustrates the operation of the receiver shown in FIG. 11.
Figure 16:
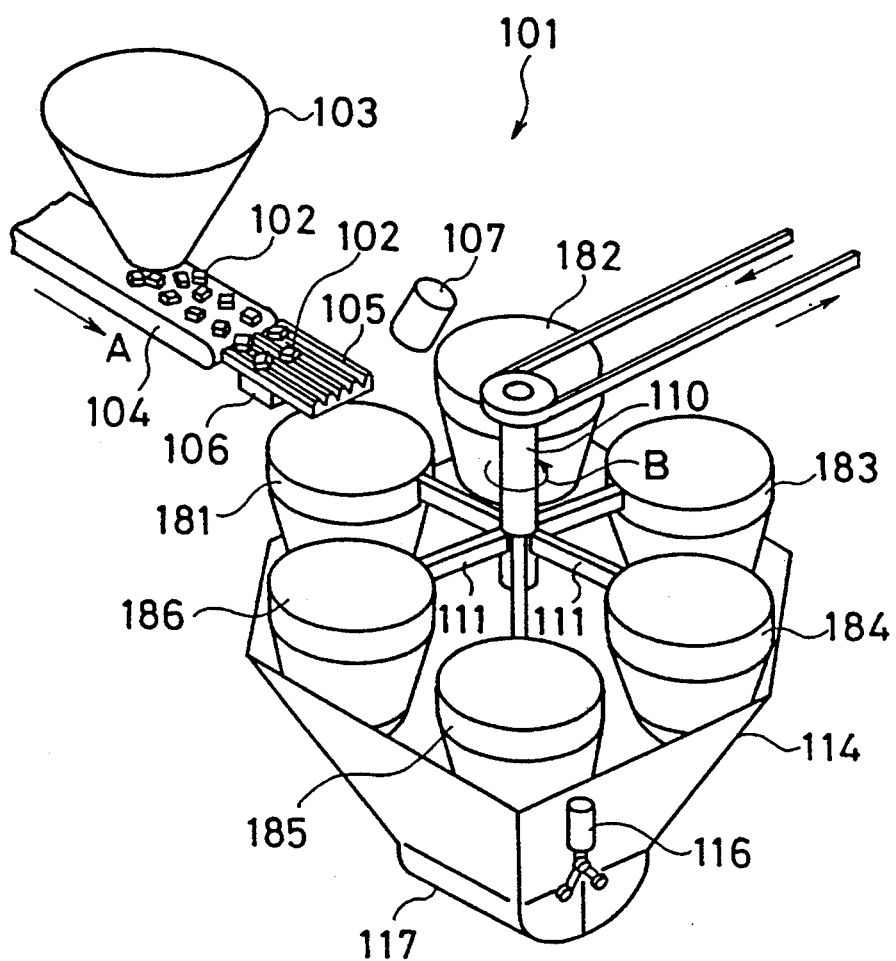
FIG. 16 is a perspective view of another preferred embodiment of the present invention.
Figure 17:
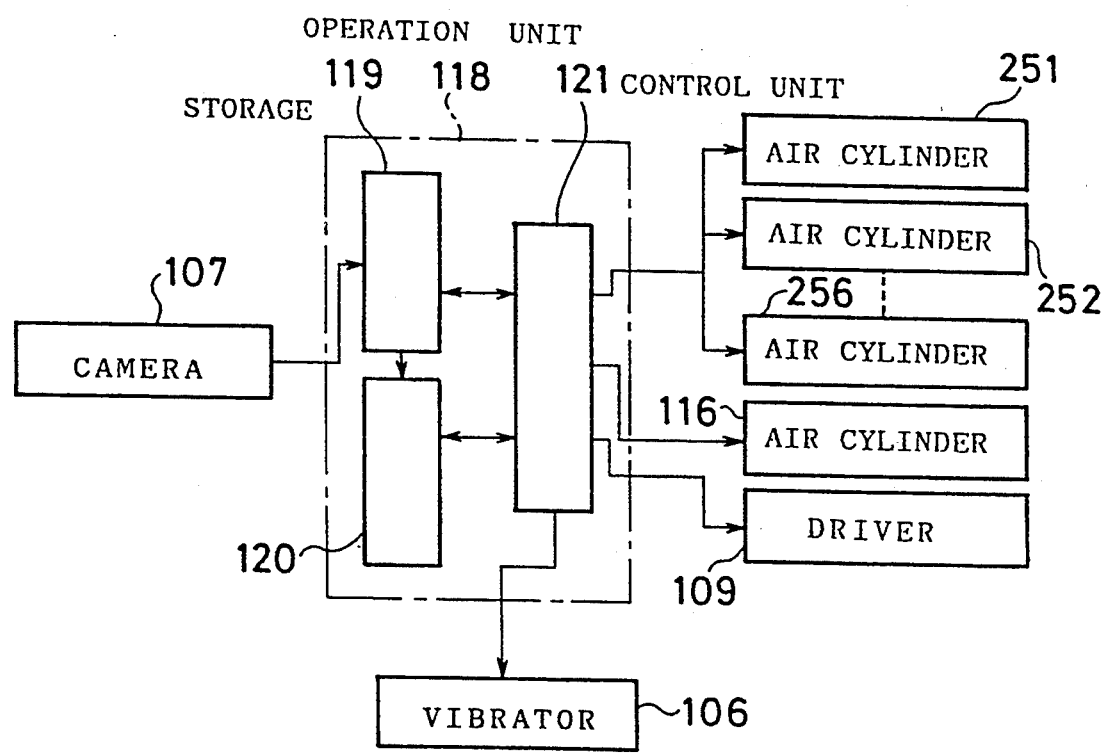
FIG. 17 a is block diagram of an electric system of the embodiment shown In FIG. 16.

In the opening unit 12, as shown in FIGS. 11–13, an operating rod of the air cylinder pushes a protrusion provided on the bottom of each receiver 3 to thereby open the bottom of the receiver 3. Alternatively, a modified conveyance path may be provided such that a receiver 3 is tilted to discharge parts 4 therein. The opening unit 12 shown in FIG. 11 includes an air cylinder 21 pivoted at one end to a support 23, a crank 25 pivoted at one end to a piston rod 22 of the air cylinder 21 and supported rotatably through a shaft 24 to the support 23, and an operating rod 26 pivoted at one end to the other end of the crank 25. The operating rod 26 is pivoted at the other end to an engaging member 28 pivoted through a shaft 27 to the support 23. When the air cylinder 21 is actuated to extend the piston rod 22, the crank 25 is rotated around the shaft 24 in the direction of P to thereby extrude the operating rod 26 in the direction of Q. As a result, the engaging member 28 is rotated around the shaft 27 in the direction of R to thereby hit on a roller 80 provided on a protrusion 29 provided on a receiver 3 carried in the direction of A, as shown in FIG. 14. As shown in detail in FIGS. 12 and 13, a receiver 3 where the protrusion 29 is pivoted to one sidewall 41 through a shaft 42 also has two bottom plates 43 and 44, which are attached to links 45 and 46, which are, in turn, attached rotatably through shafts 47 and 48 to sidewalls 41 and 49, respectively. The links 45 and 46 are connected rotatably through shafts 50 and 51 to links 52 and 53, respectively, which are connected rotatably to link 55 through a shaft 54. The link 55 is connected rotatably to the protrusion 29 through a shaft 56. When In the receiver 3 thus composed the engaging member 28 hits on the roller 30 of the protrusion 29 provided on the receiver 3 conveyed in the direction of A as the result of rotation of the engaging member 28 in the direction of R, the protrusion 29 is turned around the shaft 42. As a result, the respective links 55, 52, 53, 45 and 46 are turned to thereby open the bottom plates 43 and 44 as shown in FIG. 15. Stops 57 and 58 are attached to the sidewalls 41 and 49 to restrict the closing angle of the bottom plates 43 and 44 and the turning angles of the links 45 and 46, respectively. As described above, in the opening unit 12 in the present invention, arrangement may be such that the operating rod 26 of the air cylinder 21 hit on the protrusion 29 provided on the bottom plates 43 and 44 of the part receiver 3 to thereby open the bottom plates, as shown in FIG. 11.

In the above embodiment, sets of articles which have not being determined as a combination may be once discharged and then new parts may be fed instead. Alternatively, by feeding new parts 4 into the emptied receiver 3, the parts in this receiver may be combined with any one of sets of parts in the respective receivers 3 not combined so far. While the embodiment directed to combination of the number stored at storage position P11 and the number stored already at another storage position has been described above, the present invention is not limited to this embodiment. The combination may include all $_nC_r$ combinations for all combined patterns which are what is called general combinations.

While in the above embodiment collection of a constant number of parts has been carried out, collection of a constant weight of parts may be carried out instead. In this case, the weight of parts measured by the weight meter 9 may be used as it is to obtain a target weight.

Next, referring to FIGS. 16–21, another embodiment of the present invention will be described. In the constant-number-of-parts collecting apparatus 101 of the present embodiment, about 15 small parts which is about half of 30 small parts 102 to be collected as a unit are fed as a group.

Feed hopper 103 discharges parts 102 to a feed conveyer 104 provided below the hopper 103. As the feed conveyer 104 is moved in the direction of arrow A, parts 102 are sequentially discharged from a discharge port at a lower end of the hopper 103.

Many grooves which extend in the same direction as the direction of conveyance by the feed conveyer 104 are provided on a surface of the loosening shoot 105 as feed means provided at the discharge end of the feed conveyer 104. A vibrator 106 is fixed to a lower surface of the shoot 105. When the vibrator 106 (corresponding to the vibration driver 7a) vibrates, the parts lumped on the shoot 105 are loosened to thereby move forward along the grooves. While the vibrator 106 is vibrating, the feed conveyer 104 is also driven. When the vibration of the vibrator 106 stops, the feed conveyer 106 also stops.

A CCD camera 107 (corresponding to camera 16) as counting means provided before and above an end of the loosening shoot 105 counts the number of parts 102 fed from the end of the loosening shoot 105 by picking up the images of the parts.

Figure 18:
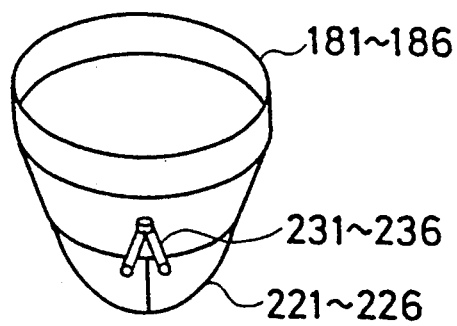
FIG. 18 is a perspective view of a hopper opening mechanism shown in FIG. 16.

Respective hoppers 181–186 as discharge means which each receive as one group a plurality of parts 102 fed from the end of the shoot 105 and discharge these parts in accordance with a discharge instruction are positioned at equal intervals on the same circumference at the center of which a drive shaft 110 is coupled to the driver 109 (see FIG. 17) through a belt and is also connected through support rods 111 to the hoppers 181–186. When drive shaft 110 rotates in the direction of arrow B, the hoppers 181–186 are rotated around the drive shaft 110 such that they are indexed sequentially to below the end of loosing hopper 105; i.e., from the hopper 181 to the hopper 182, from the hopper 182 to the hopper 183, and so on with their respective upper open ends. The respective lower ends of hoppers 181–186 are formed as discharge ports 221–226 as shown in FIG. 18 and are opened in opposite directions by release mechanisms 231–236, respectively.

Figure 19:
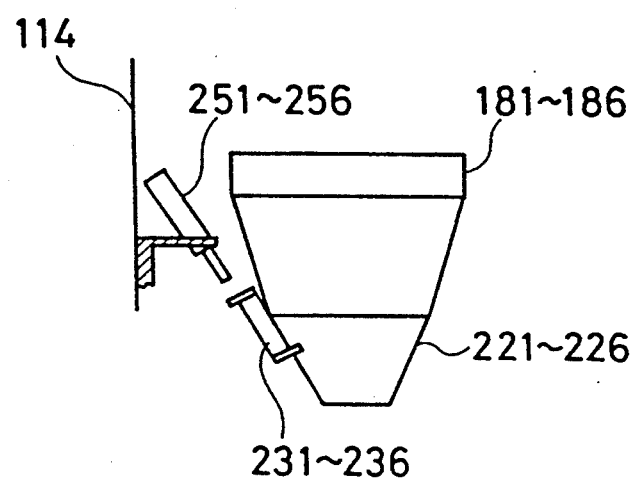
FIG. 19 is a side view of a first air cylinder of the embodiment shown in FIG. 16.

The discharge ports 221–226 of hoppers 181–186 are accommodated within an opening frame of the collecting hopper 114. Even if any one of the hoppers 181–186 is opened, parts 102 are collected in the collecting hopper 114. First air cylinders 251-256 are provided on an internal wall of the collecting hopper 114 in correspondence to the release mechanisms 231-236 of the hoppers 181-186, as shown in FIG. 19. A group of parts 102 collected in the collecting hopper 114 is discharged by actuation of the second air cylinder 116 to open the lower end 117 of the collecting hopper 114.

An operation unit 118 (see FIG. 17) corresponding to the operation unit 14 includes a storage 119 as means for storing the respective numbers of parts counted by COD camera 107, an operation subunit 120 which performs a combining operation on respective sets of parts fed from the loosing shoot 105 to the hoppers 181-186 and another already received set of parts and determines whether the resulting number of parts amounts to a target number, and a control unit 121 which outputs an operation signal to first air cylinders 251-256 in order to discharge the combined parts if the combination at the operation subunit 120 brings about the target number of parts, outputs an operation signal to the second air cylinder 116 in order to discharge the target number of parts collected In the collecting hopper 114 for packaging purposes, and outputs a rotation signal to driver 109 for drive shaft 110 if the combination for the target number of parts is not obtained. When hoppers 181-186 rotate in the direction of arrow B due to the rotation of drive shaft 110 and the adjacent respective hoppers 181-186 are sequentially indexed to be positioned at the discharge end of the loosing shoot 105, control unit 121 outputs a vibration starting signal to the vibrator 106 of the loosing shoot 105 and, when about 15 parts 102 are put into that hopper, outputs a vibration stopping signal to the vibrator.

Figure 20:
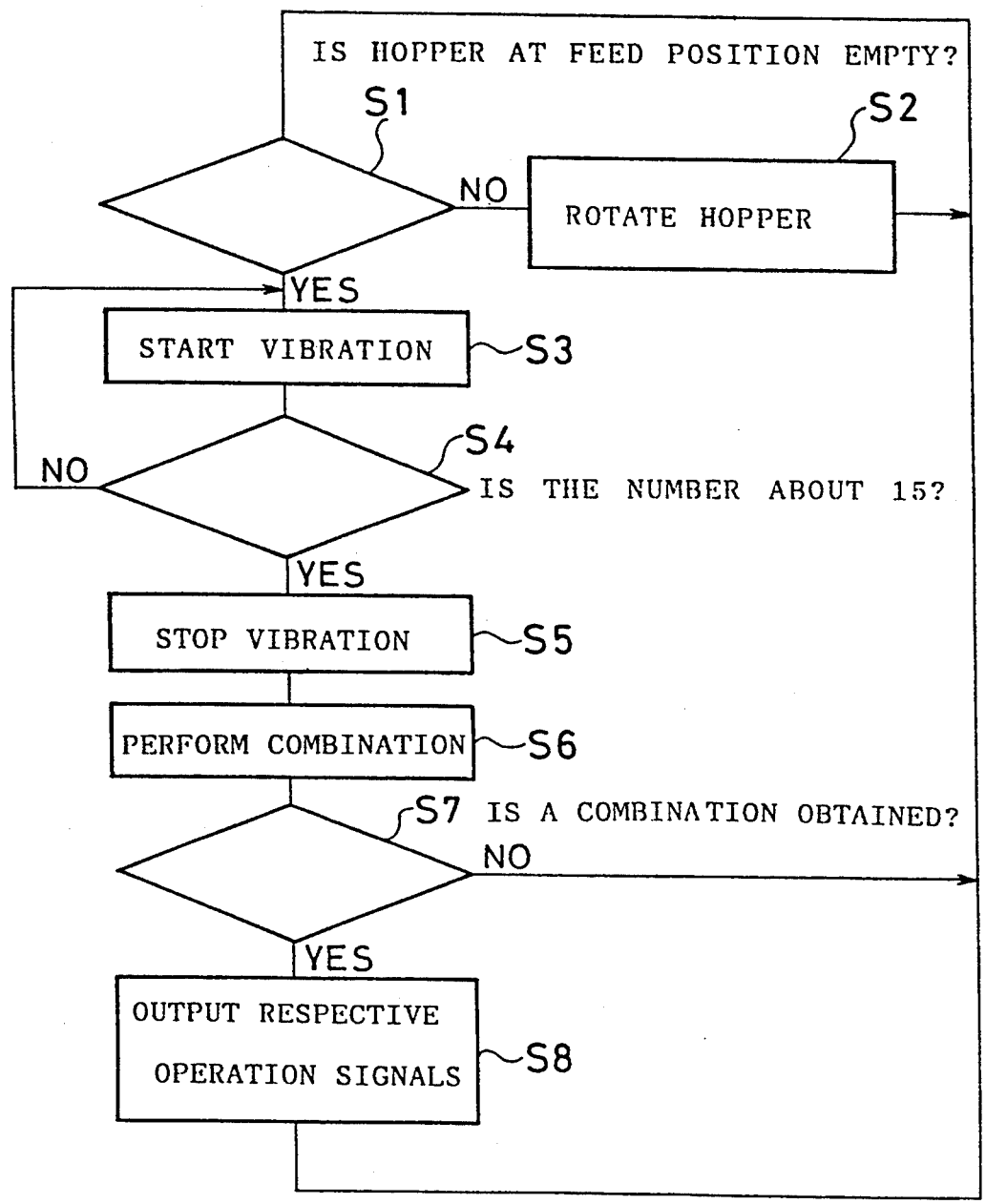
FIG. 20 is a flowchart indicative of the operation of the embodiment shown in FIG. 16.

The operation of the constant-number-of-parts collecting device 101 will be described with reference to the flowchart of FIG. 20. Parts 102 are already received in feed hopper 103. If, for example, hopper 181 positioned below the discharge end of loosing shoot 105 (hereinafter referred to as a "feed position") is empty (step S1), control unit 121 of operation unit 118 outputs a vibration starting signal to vibrator 106 (step S3).

In response to this signal, vibrator 106 vibrates, at which time feed conveyer 104 is carried in the direction of arrow A. Parts 102 discharged from feed hopper 103 to feed conveyer 104 are transferred from feed conveyer 104 to loosing shoot 105. A lump of parts 102 on loosing shoot 105 advances toward the discharge end along the grooves in loosing shoot 105 while being loosening by vibration and falls into hopper 181 positioned at the feed position.

The images of parts 102 falling from the discharge end of loosing shoot 105 are picked up by CCD camera 107, and the number 7 of them are counted and stored in storage 119. When the number of parts 102 fed into hopper 181 amounts to about 115 (step S4), control unit 121 outputs a vibration stopping signal to vibrator 106 (step S5).

Since sets of parts 102 uneven in the number of parts from set to set are fed to corresponding hoppers from loosing shoot 105 by the vibration of vibrato 106, about 15 parts 102 including exactly 15 parts are obtained. When, for example, 13 parts 102 are fed into hopper 181, the operation subunit 120 of operation unit 118 performs a combining operation on the sets of parts including the set of 13 parts (step S6).

When a combination is obtained which results in a set of 30 parts as the target number of parts as the result of combination of the set of 13 parts in hopper 181 and any one of the sets of parts already received in hoppers 182-186 other than hopper 181 (step S7), an operation signal is output to first air cylinders 251-256 from control unit 121 in order to discharge parts in the appropriate hopper to collection hopper 114. When the appropriate ones of air cylinders 251-256 corresponding to release mechanisms 231-236 of the hoppers 181-186 are actuated, the combined sets of parts are discharged to collection hopper 114. Thereafter, control unit 121 outputs an operation signal to second air cylinder 116 of collection hopper 114 (step S8), and the lower end 117 of collection hopper 114 is opened to discharge and package the target number of (30) parts.

If no desired combination is obtained and 30 parts are discharged, operation subunit 120 again determines whether respective hoppers 181-186 at the feed position are empty. If not, control unit 121 outputs a rotation signal to driver 109 to actuate same to thereby rotate drive shaft 110 in the direction of arrow B and hence to index hoppers 181-186 by a distance for one hopper (step S2). Thereafter, similar operations are repeated.

Figure 21:
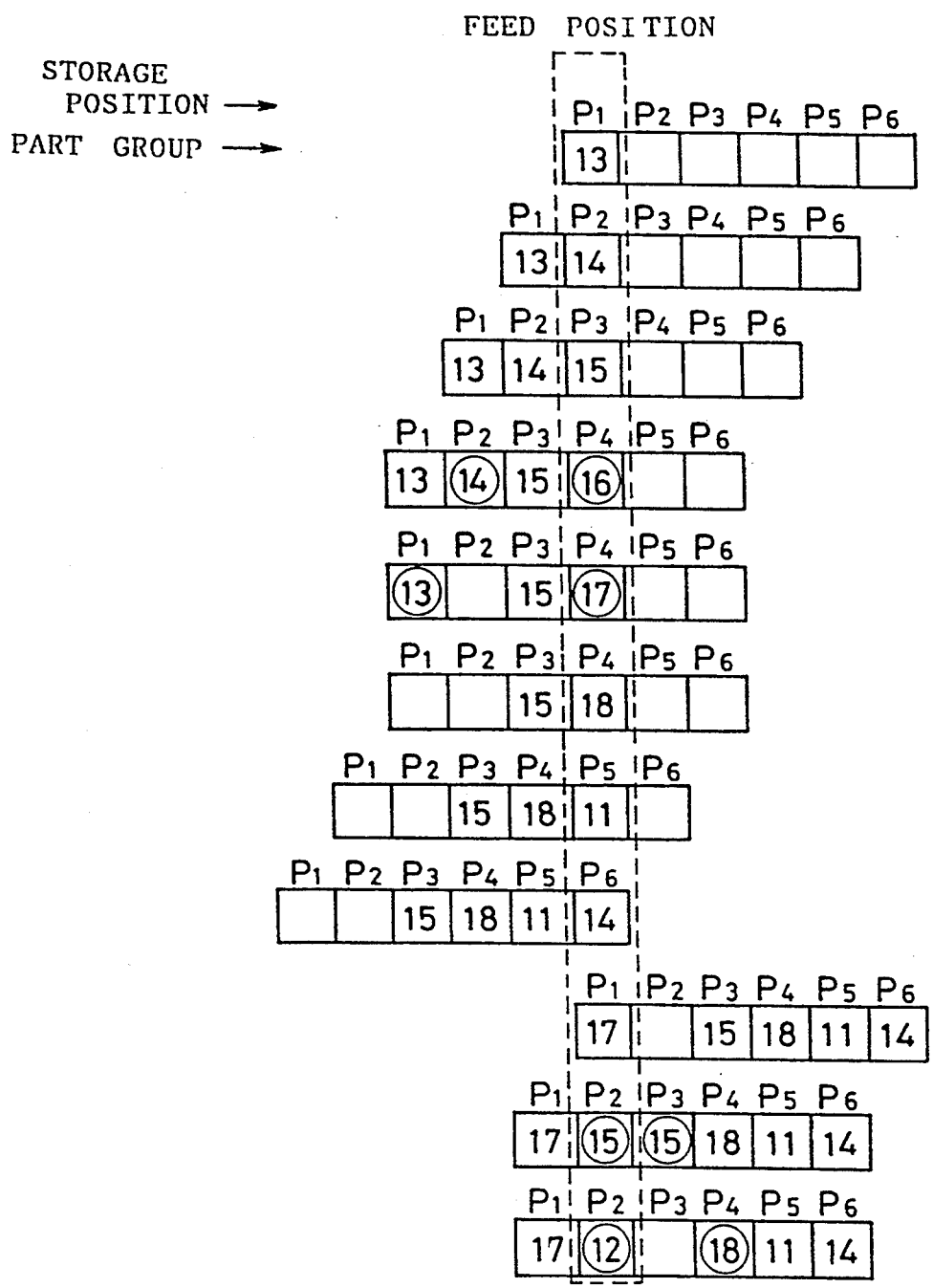
FIG. 21 illustrates a combination performed in FIG. 20.
Figure 22:
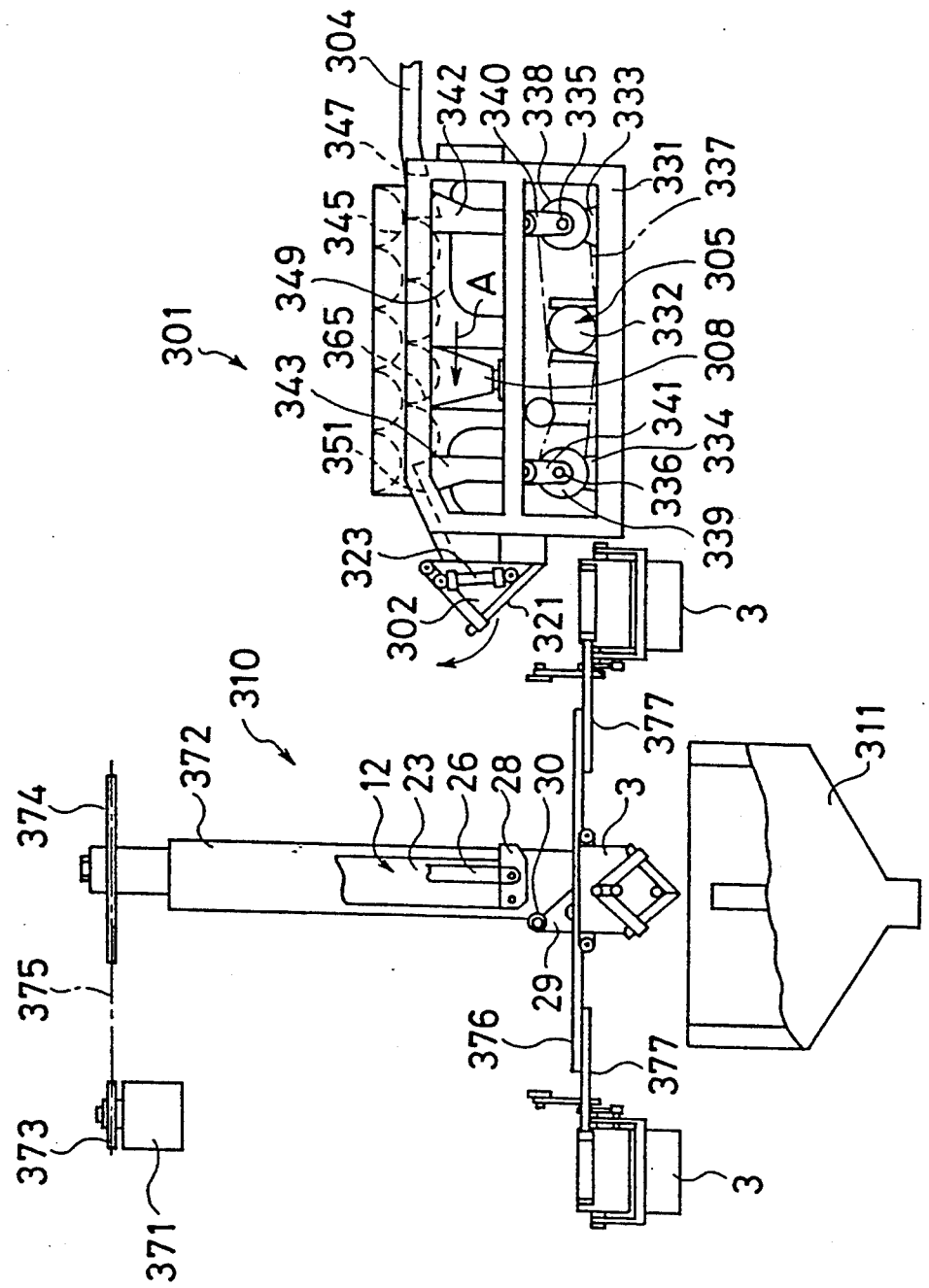
FIG. 22 is a side view of a further preferred embodiment of the present invention.
Figure 23:
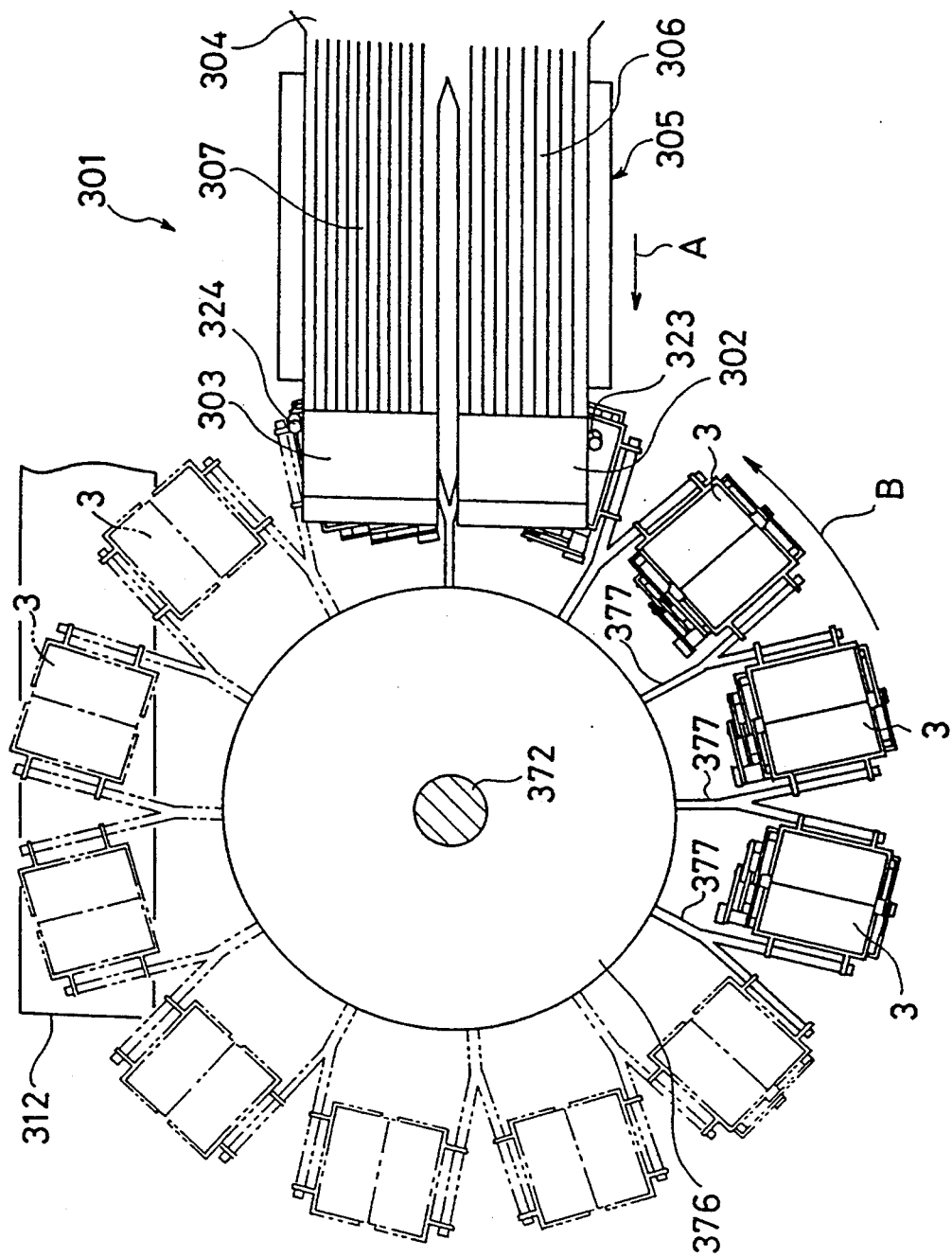
FIG. 23 is a schematic plan view of the embodiment shown in FIG. 22.
Figure 24:
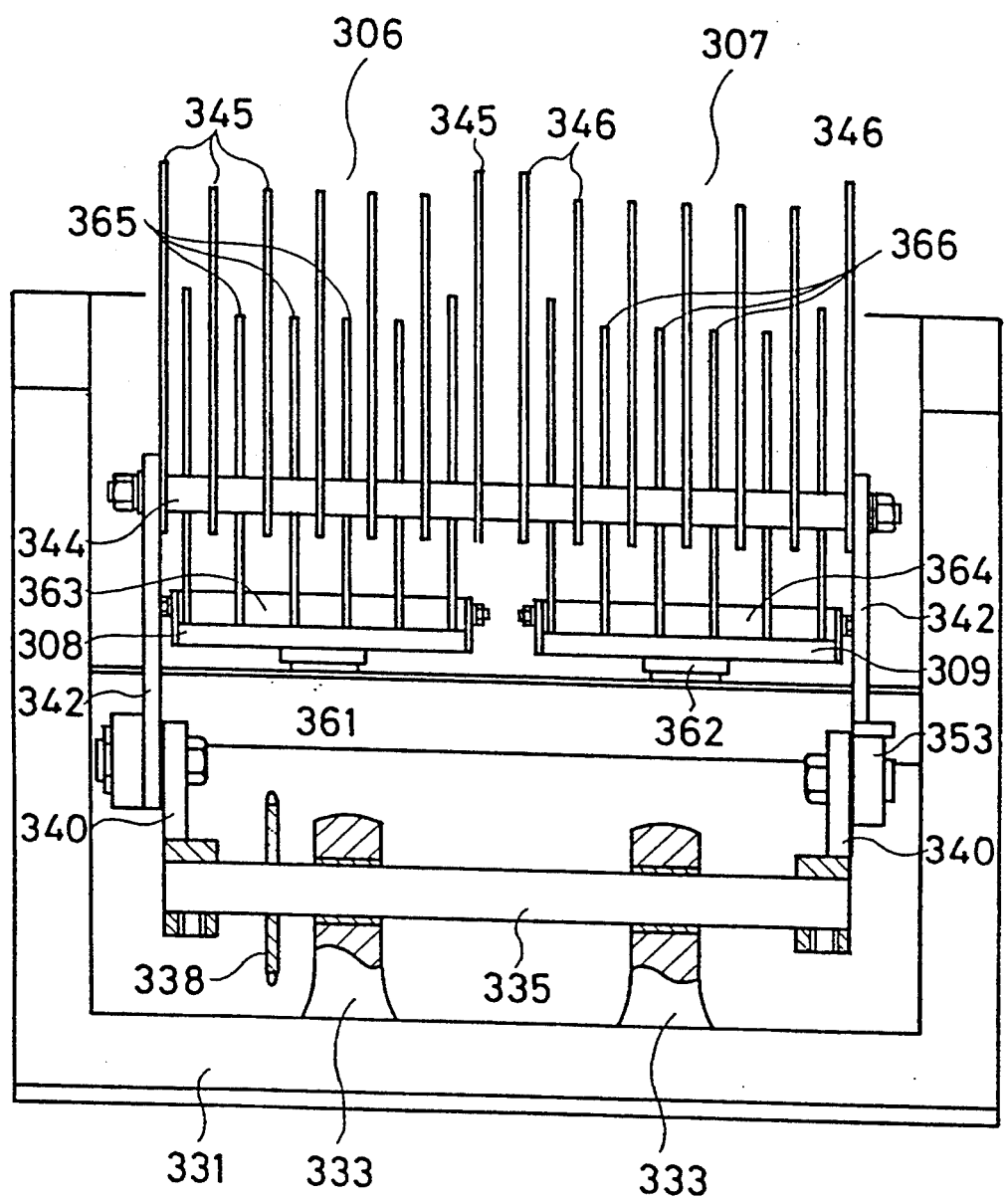
FIG. 24 is a front view of a conveyer shown in FIG. 22 and part of which conveyer is omitted from illustration.
Figure 25:
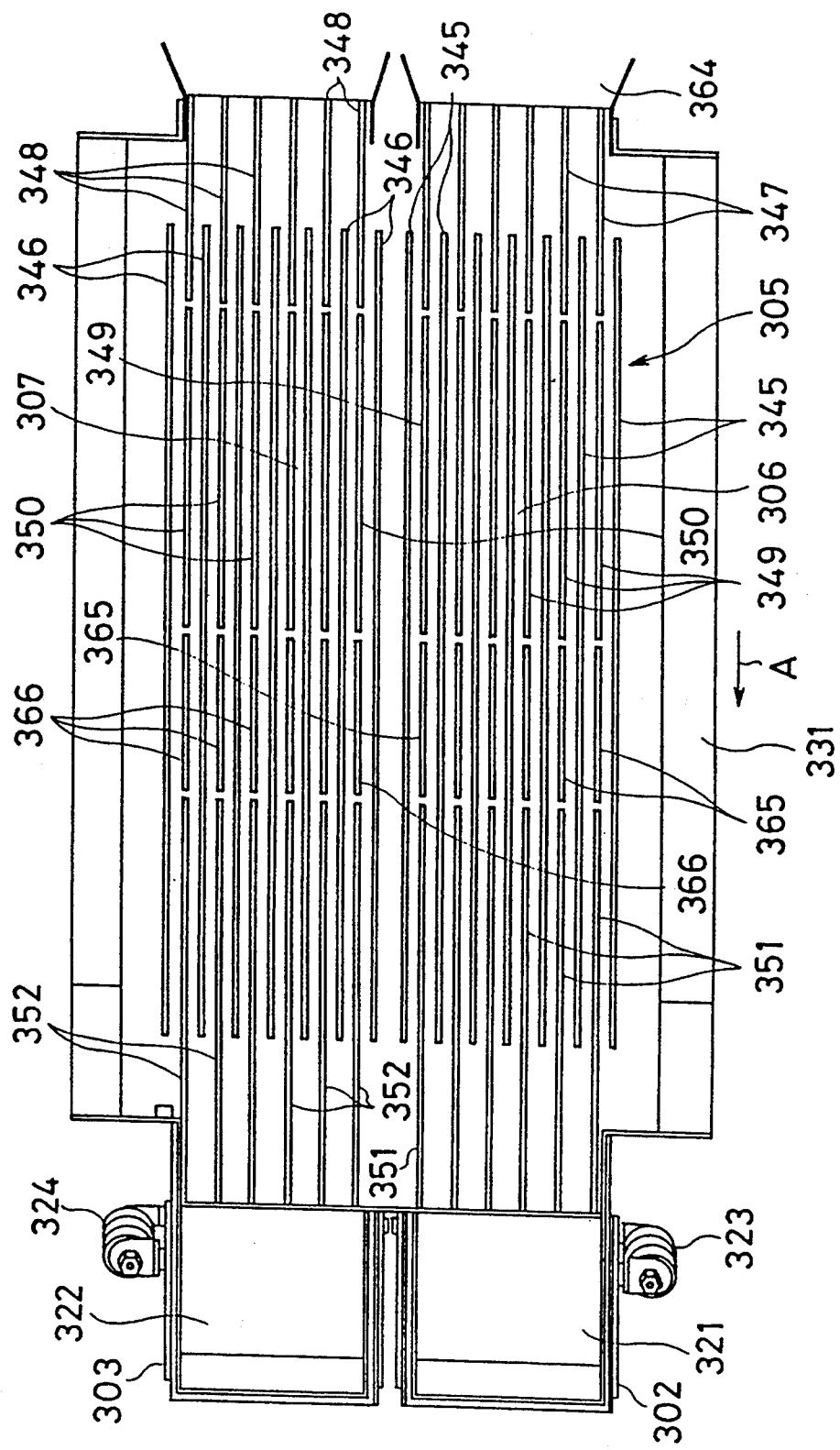
FIG. 25 is a plan view of the conveyer shown in FIG. 22.

A specified combining operation conforming to the above flowchart will be next described. Operation subunit 120 of operation unit 118 performs a combining operation. Storage positions for this combining operation are shown in FIG. 21. The combining operation will be described with reference to Table 3 which shows the respective numbers of parts fed into hoppers 181-186 and the result of the combinations. Storage position P1 corresponds to hopper 181; storage position P2 to hopper 182; similarly, storage positions P3, P4, P5 and P6 to hoppers 183, 184, 185 and 186, respectively.

When, first, hopper 181 is placed at the feed position, 13 parts are fed into the hopper and 13 is input to storage position P1. Operation subunit 120 performs a combining operation in this state, but does not provide a desired combination. Thus, drive shaft 110 is rotated to thereby position hopper 182 at the feed position. Fourteen parts are fed into hopper 182 and 14 is input to storage position P2 corresponding to hopper 182. It is then determined whether the sum of 14 and 13 at storage positions P2 and P1, respectively, is 30 as the target number. However, no desired combination set is obtained either in this case.

Then, 15 is input to storage position P3, but no desired combination set is obtained as the result of the combining operation. When 16 is entered into storage position P4, it is combined with the respective numbers already input to storage positions P1-P3. As a result, the combination of 16 at storage position P4 and 14 at storage position P2 provides 30 as the target number, and 16 parts in hopper 184 corresponding to storage position P4 and 14 parts in hopper 182 corresponding to storage position P4 are discharged as a combination set to collection hopper 114. When this combination set a is discharged, hopper 186 becomes empty. Thus, hoppers 181-186 do not rotate and parts 102 are again fed into hopper 184. In this way, combinations are performed and combination sets b, c and d are obtained as shown in Table 3.

When in the present embodiment the number of parts 102 fed is counted by CCD camera 107, loosing shoot 105 may be a conveyer scale in which case the number of parts is calculated on the basis of a preset weight of a single part.

Alternatively, two discharge positions may be provided where parts are fed into the discharge means such that at one discharge position a set of parts of a number close to the target number is fed while at the other discharge position a few parts are fed.

If no desirable target combination is obtained even if parts 102 are fed into all hoppers 181–186 as discharge means, parts in one hopper and parts in another hopper may be forcedly discharged where the difference between the number of parts in the former hopper and the number of parts in the latter hopper is larger than the difference between the respective numbers of parts in any two of hoppers 181–186. Alternately, all the parts in hoppers 181–186 may be once discharged and such a combining operation may be performed again from the beginning.

While the combining operation between a number at a storage position corresponding to the feed means at the feed position and each of numbers at other storage positions has been described, the present invention is not limited to this and all $_nC_r$ combinations may be used which involves combination patterns, as mentioned above. As an example in this case, all combinations are performed without using as a reference the number of parts fed now into a hopper, and an empty hopper is rotated until it arrives at the feed position.

Alternatively, also in the present embodiment, respective sets of parts uneven in the number of parts from set to set with the number parts of each set being close to a 1/N (N=3, 4, 5 . . .) of a target number required may be fed. Further, also in this embodiment, a constant weight of parts may be collected in place of a constant number of parts.

TABLE 3

|  | Storage position | | | | | |
| --- | --- | --- | --- | --- | --- | --- |
|  | P1 | P2 | P3 | P4 | P5 | P6 |
| Number of parts | 13 | 14 | 15 | 16 |  |  |
| Combination |  | a |  | a |  |  |
| Number of parts | 13 |  | 15 | 17 |  |  |
| Combination | b |  |  | b |  |  |
| Number of parts | 17 | 15 | 15 | 18 | 11 | 14 |
| Combination |  | c | c |  |  |  |
| Number of counts | 17 | 12 |  | 18 | 11 | 14 |
| Combination |  | d |  | d |  |  |

While in the constant-number-of-parts collecting device 101 the hoppers 181–186 as receivers are moved in the direction of B by the driver means provided above the hoppers, an article collecting device according to the present invention may be composed so as to include such driver means in receivers 3 described above with reference to FIG. 11. As shown in FIGS. 22–25, a constant-weight-of-parts collecting device 301 in which a plurality of receivers 3 corresponding to hoppers 181–186 is moved in the direction of B by the driver means provided above the hoppers includes two Juxtaposed standby hoppers 302 and 303, a conveyer device 305 which conveys parts from shoot 304 to standby hoppers 302 and 303, weight meters 308 and 309 disposed halfway through the corresponding conveyance passageways 306 and 307, respectively, of the conveyer device 305 to measure the weights of parts, a plurality of receivers 3 disposed in ring so as to pass below standby hoppers 302 and 303, a turning unit 310 provided above the receiver 3 to turn these receivers 3 in the direction of B, collecting hopper 311 disposed below the passageway for the receivers 3, a discharge conveyer 312 disposed below the passageway of the receivers 3, and an opening unit 12 disposed above collecting hopper 311 and discharge conveyer 312 and described with reference to FIGS. 11–15 (the opening unit on the side of discharge conveyer 312 is not shown). The constant-weight-of-parts collecting device 301 of this embodiment also includes elements such as operation unit 14 or 118 and encoder 5 which detects the respective current positions of receivers 3, as mentioned above (not shown).

Standby hopper 302 and 303 include openable tilted bottom plates 321 and 322 and air cylinders 323 and 324 for opening/closing the bottom plates 321 and 322, respectively. When air cylinder 323 or 324 is actuated by an operation signal from operation unit 14, bottom plate 321 or 322 is opened to thereby feed the parts placed in standby hopper 302 or 303 into receivers 3 moved below standby hopper 302 or 303.

Conveyer device 305 includes an electric motor 332 fixed to a frame 331 and having an output rotation shaft to which a sprocket wheel is attached, two shafts 335 and 336 provided rotatably through bearings 333 and 334 on frame 331, sprocket wheels 338 and 339 attached fixedly to shafts 335 and 336, respectively, and coupled through endless chain 337 to the sprocket wheel of motor 332, swinging arms 340 and 341 fixed to shafts 335 and 336, respectively, support arms 342 and 343 connected rotatably to swinging arms 340 and 341, respectively, rods 344 attached to corresponding support arms 342 and 343 (the rod on the side of support arm 343 Is not shown), two sets of many thin plates 345 and 346 attached at one end to corresponding rods 344, two sets of many thin rods 347 and 348 supported at one end by shoot 340 and disposed alternately with thin plates 345 and 346, respectively, two sets of many thin intermediate plates 349 and 350 supported by frame 331 and disposed alternately with thin plates 345 and 346, respectively, and two sets of many thin plates 351 and 352 supported by frame 331 and disposed alternately with thin plates 345 and 346, respectively. Thin plates 345, 346 and 349, 350 except both outer thin plates are formed so as to have an upper corrugated (successively semicircular) edge. Also, thin plates 351 and 352 have at one end an upper successively circular upper edge. Thin rods 347 and 348 are bent upwards at a free end. One of support arms 342 is provided so as to slide along the outer periphery of a disc 353 provided at one end of the corresponding swinging arm 340. The other of support arm 343 also has a similar structure. A sensor (not shown) which senses the rotational speed of shaft 335 is provided on conveyer device 305.

When motor 332 is operated and its output rotational shaft is rotated in the conveyer device 305, thus constructed, this rotation is transmitted through chain 337, sprocket wheels 338 and 339 to shafts 335 and 336 to thereby rotate same. As a result, swinging arms 340 and 341 are also rotated, so that thin plates 345 and 346 attached to support arms 342 and 343, respectively, make a circular motion through among and vertically relative to thin rods 347, 348 and thin plates 349, 350, 351 and 352. As a result, the parts fed from shoot 304 to thin rods 347 and 348 are sequentially carried in the direction of A to upper valleys in thin plates 345 and 346, thence to upper valleys in thin plates 349 and 350, thence further to upper valleys in thin plates 345 and 346 alternately and finally to upper tilted edges of thin plates 351 and 352 through upper valleys in thin plates 351 and 352. The parts carried to the tilted upper edges of thin plates 351 and 352 are then fed to standby hoppers 302 and 303. As will be obvious from the above, conveyer device 305 includes a conveyer passageway unit 306 comprising thin rods 347 and thin plates 345, 349 and 351; and a conveyer passageway unit 307 comprising thin rods 348, and thin plates 346, 350 and 352. When at least one part is fed into standby hopper 302 or 303, motor 332 is controlled so as to stop in the conveyer device 305. This control is provided on the basis of signals from weight meters 308 and 309 and a sensor which senses the rotational speed of shaft 335, as will be described in more detail later.

Weight meters 308 and 309 include weight sensors 361 and 362, respectively, attached to frame 331, support members 363 and 364 attached to weight sensors 361 and 362, respectively, and many thin plates 365 and 366 supported by support members 863 and 364 and disposed among thing plates 345 and 346, respectively. Two sets of thin plates 365 and 366 have an upper semicircular edge and are disposed between thin plates 349, 350 and 351, 352 in the direction of part conveyance. Conveyance of parts from thin plates 349 and 350 to thin plates 351 and 352, as mentioned above, are performed after temporary placement of the parts in the valleys in the upper edges of thin plates 365 and 366. Therefore, weight meter 308 measures the weight of parts carried through conveyer passageway 306 while weight meter 309 measures the weight of parts carried through conveyance passageway 307.

Turning unit 310 includes an electric motor 371 attached to a frame (not shown) above receivers 3, a rotational shaft 372 supported rotatably by the frame, sprocket wheels 373 and 374 fixed respectively to the output rotational shaft of motor 371 and rotational shaft 372, a chain 375 extending around sprocket wheels 373 and 374, a disc 376 attached to a lower end of rotational shaft 372, and support arms 377 each attached at one end to disc 376 and having a receiver 3 at the other end. When rotational shaft 372 is rotated in turning unit 310 by the operation of motor 371 through sprocket wheel 373, chain 375 and sprocket wheel 374, receivers 3 are moved (turned) in the direction of B. By this movement in the direction of B, each receiver 3 passes below standby hoppers 302 and 303 and above discharge conveyer 312 and collection hopper 311.

Collection hopper 311 collects parts falling from a receiver 3 selected due to the actuation of opening unit 12 and feeds the parts into a bag or the like disposed below for bagging purposes.

Discharge conveyer 312 receives parts in receiver 3 which is not used for combination and discharges those parts for use in recombination. As mentioned above, an opening unit 12 including engaging member 28 is provided also above discharge conveyer 312.

Alternatively, two opening units 12 may be provided above collection hopper 311 such that two receivers 3 feed parts used for combination to collection hopper 311.

The constant-weight-of-parts collecting device 301, constructed as mentioned above, is operated on the basis of a program, similarly to the manner as mentioned above. Since in the constant-weight-of-parts collecting device 301 of this embodiment the motor 371 of turning unit 310 and air cylinder 21 of opening unit 12 are disposed above receiver 3 which is likely to be contaminated by the parts, washing receivers 3 can be made without sprinkling water over the motor 371 and air cylinder 21 of opening unit 12. Thus, the constant-weight-of-parts collecting device 301 of this embodiment is easy to maintain. Also in the present embodiment, a constant-number-of-parts collection may be performed in place of the constant-weight-of-parts collection.

Figure 26:
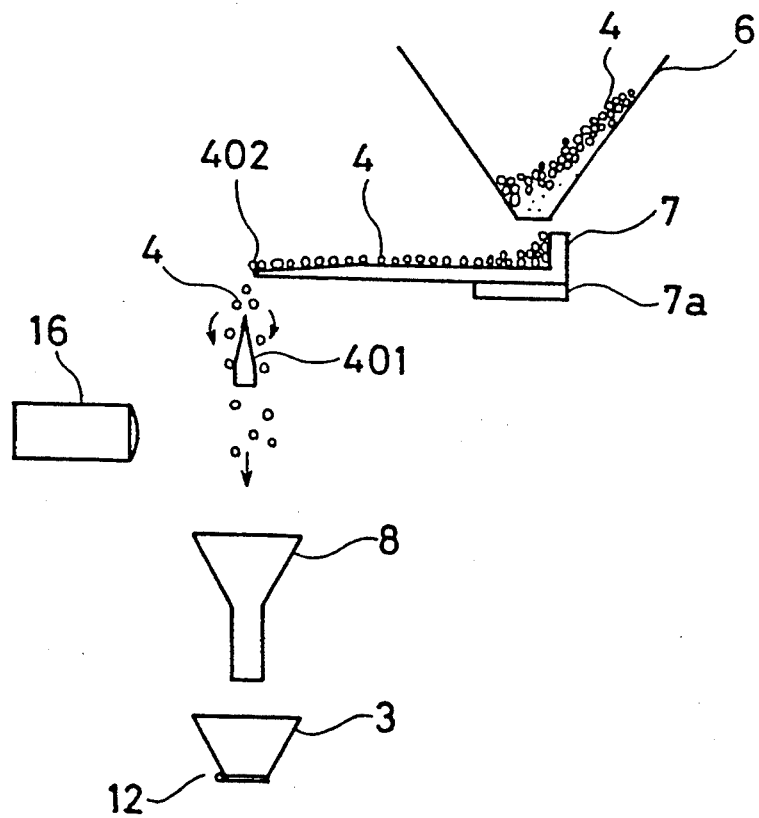
FIG. 26 is a side view of another embodiment of the present Invention.
Figure 27:
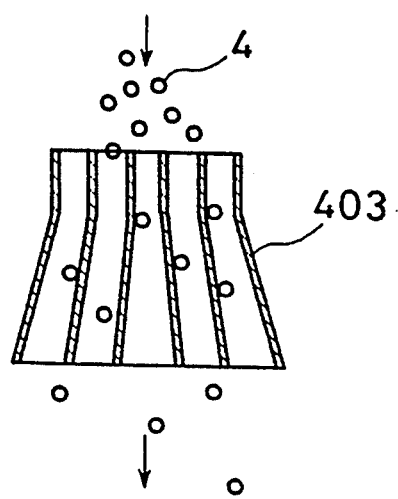
FIG. 27 is a cross-sectional view of another distributing means.

While in the feed unit 5 or 15 shown in FIG. 3 or 9, shoot 7 feeds parts 4 directly to hopper 8, arrangement may be such as shown in FIG. 26. A baffle 401 is provided below the discharge end 402 of loosing shoot 7 so as to hinder and scatter parts 4 falling from the discharge end 402. CCD camera 16 has an image pickup region which is a passageway through which the parts 4 fall. Baffle 401 is provided so as to hinder the fall of parts 4 to scatter those parts which fall all of a lump. As shown in FIG. 27, as other scattering means, a funnel-like trough 403 having a plurality of passageways therein for parts 4 or a tilted ski-like plate may be provided so as to scatter parts 4 which fall all of a lump. In addition to CCD camera 16, sensing means may be of the type which counts the number of parts on the basis of a reflection of a supersonic signal or an optical signal reflected by, or transmitted through, a supersonic sensor or an optical sensor.

Figure 28:
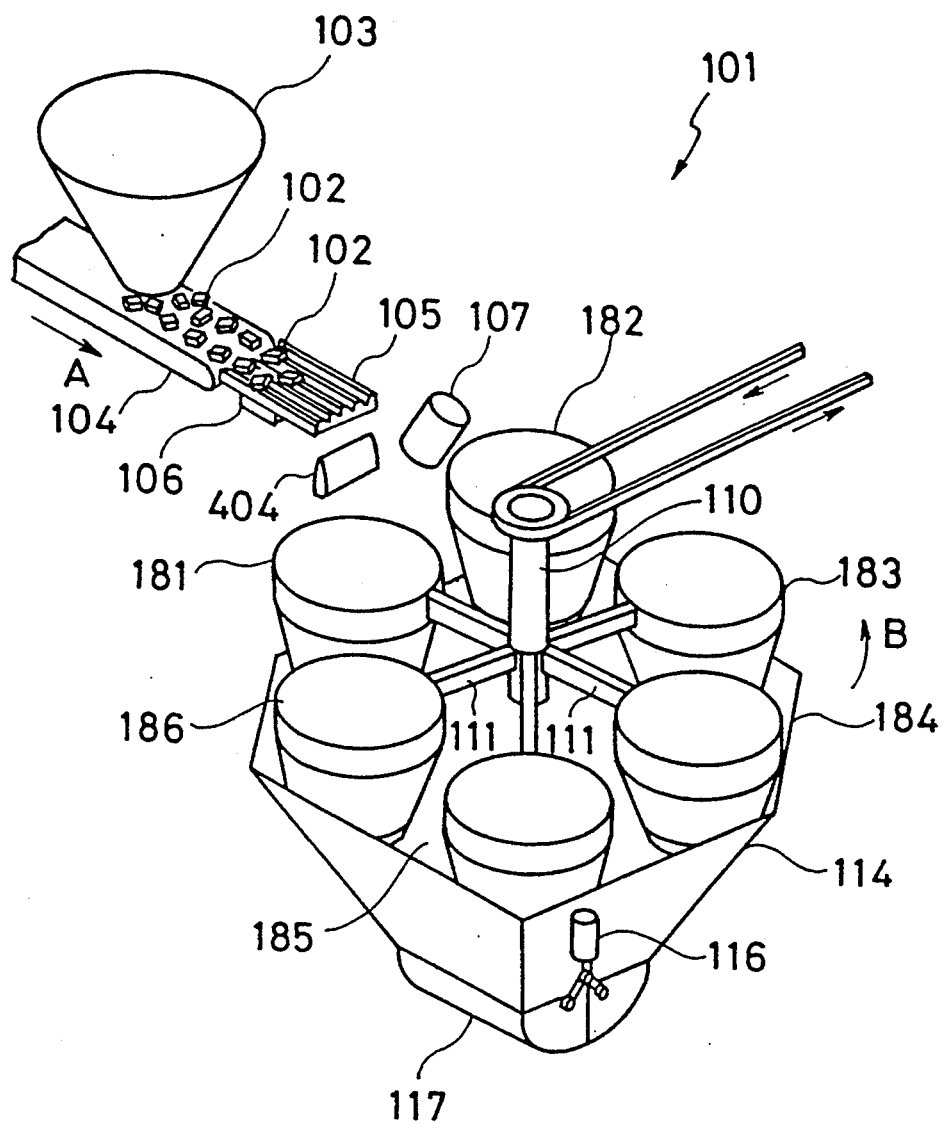
FIG. 28 is a perspective view of another embodiment of the present invention.

While in the above embodiments the feed unit 5 or 15 having a shoot 7 is provided with a baffle, the baffle 404 may be provided below an end of shoot 105 of the constant-number-of-parts collecting device 101, as shown in FIG. 28. The images of parts 102 scattered by baffle 404 are picked up by CCD camera 107 and counted.

While in the present embodiment the feed conveyer 104 is illustrated as having the loosing shoot 5, loosing shoot 5 may be omitted such that parts 102 fall from the discharge end of feed conveyer 104 and are scattered by baffle 404 as the scattering means.

Figure 29:
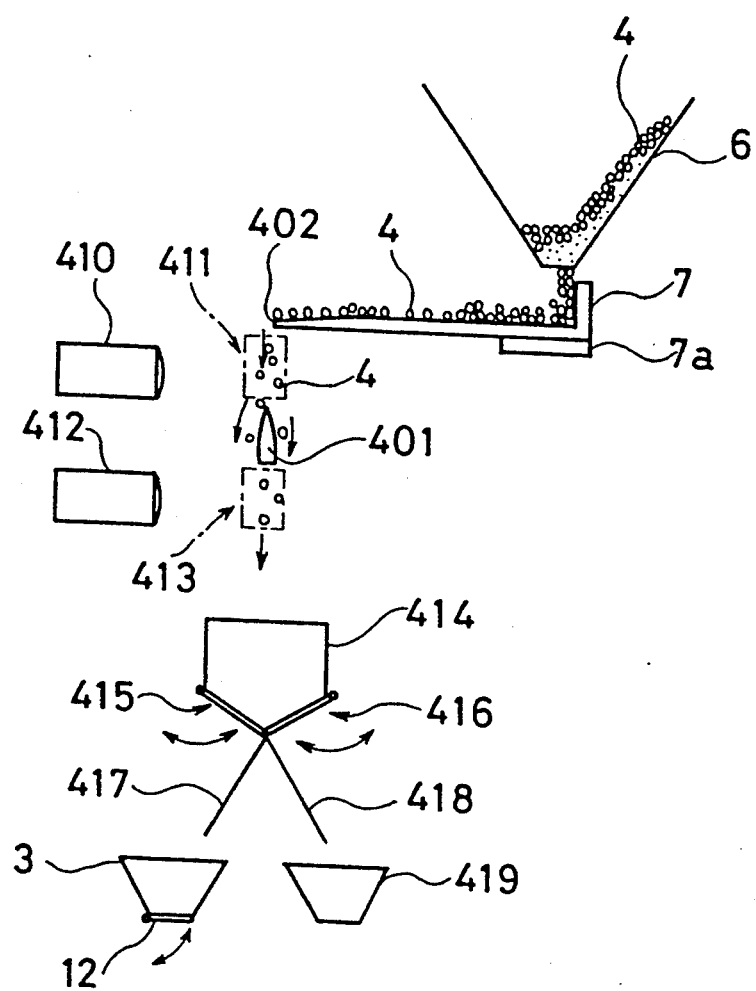
FIG. 29 is a side view of another embodiment of the present invention.

As shown in FIG. 29, in the present Invention, the following arrangement may be used including baffle 401. In FIG. 29, first CCD camera 410 has as a first image pickup region 411 a passageway through which the parts 4 fall and disposed below the discharge end 402 of loosing shoot 7 and above baffle 401. It picks up the images of parts falling at a time and detects the number of parts. A second CCD camera 41 similarly has as a second image pickup region 413 a passageway through which parts 4 fall and disposed below baffle 401.

A collection hopper 414 which temporarily receives parts falling at a time has at a lower end a first open/close unit 415 and a second open/close unit 416 which are opened depending on whether the parts collected in the hopper 414 should be packaged or discharged, respectively, for distributing purposes.

Figure 30:
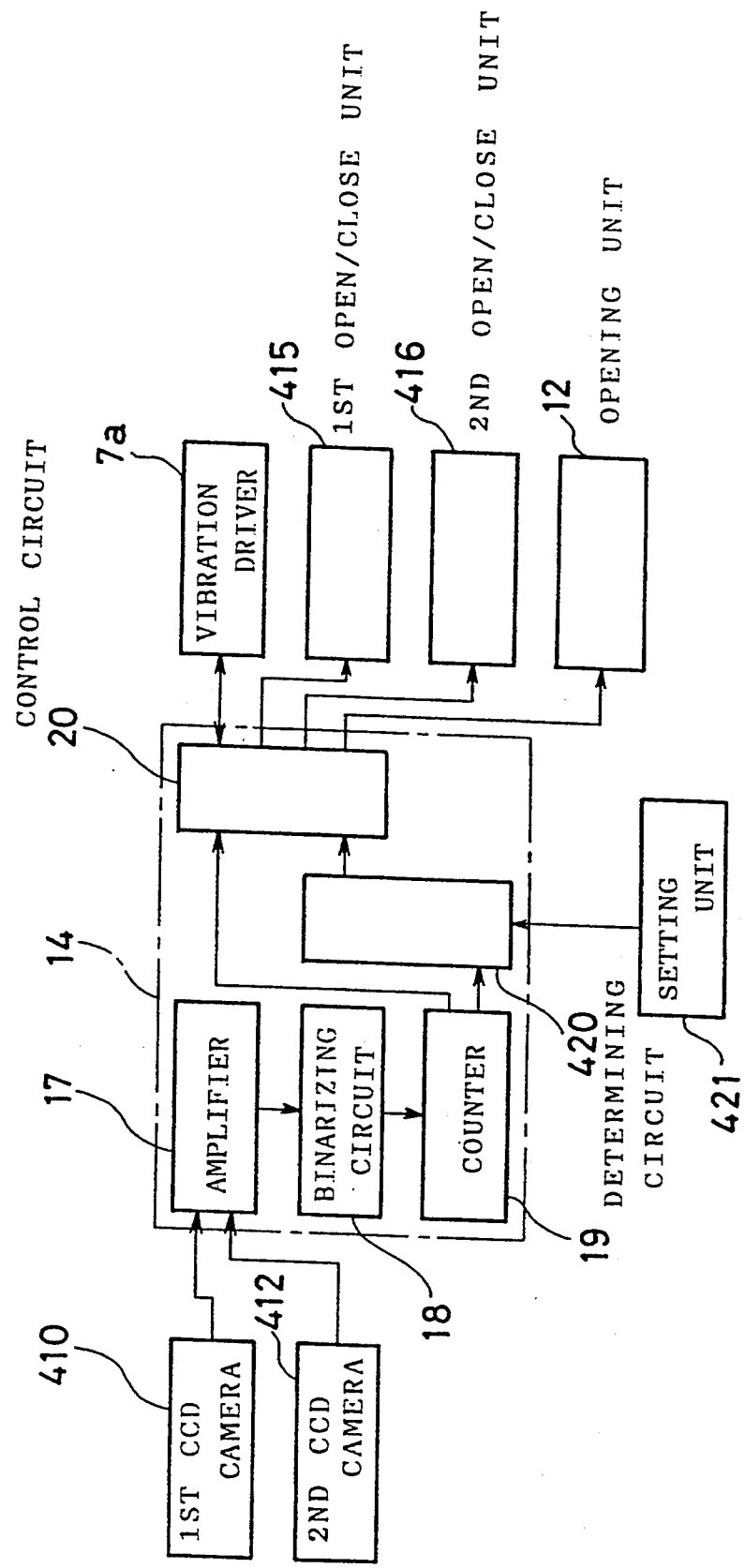
FIG. 30 is a block diagram of an electric system in the embodiment of FIG. 29.

As shown in FIG. 30, the image pickup output signals from the first and second CCD cameras 410 and 412 are delivered to the operation unit 14, which counts the number of the falling parts and determines whether the parts in the hopper 414 should be packaged or discharged depending on the resulting count to thereby control the opening/closing of the first and second open/close unit 415.

The image pickup output signals are amplified by an amplifier 17 and delivered to a binarizing circuit 18. The binarized image pickup signals for the parts 4 are counted by a counter 19 and the resulting signal is delivered to a determining circuit 420 and a control circuit 20. The number of parts counted by the counter 19 amounts to a required number, the control circuit 20 delivers a vibration stopping signal to the vibration driver 7a. The determining circuit 420 determines whether the parts should be packaged or discharged depending on the flowchart of FIG. 31. Depending on the result of the determination by the determining circuit 420, the control circuit 20 outputs an opening signal to the first open/close unit 415 or the second open/close unit 416. A setting unit 421 inputs a set number as a package unit to the determining circuit 420.

When the parts should be packaged as the result of the determination by the determining unit 420, the first open/close unit 415 is opened, the part receiver 3 which receive parts fed by a guide 417 provided below the first open/close unit 415 has at a lower end a discharger 12 which is used for packaging parts as one packaging unit. The discharger 12 is opened by an opening signal from the control circuit 20 and the parts in the part receiver 3 are put into a bag (not shown) or the like. When the parts are should be discharged, the second open/close unit 416 is opened and a discharge hopper 419 receives parts discharged through the guide 418.

The operation of the small part counting device having the above structure will be described. The parts 4 in the feed hopper 6 gradually flow from the lower end of the hopper 6 downward to the loosening shoot 7. The parts 4 on the shoot 7 gradually advance due to the vibration of the vibration driver 7a and falls from the discharge end 402 of the shoot 7. The images of the falling parts 4 are first picked up and counted by the first CCD camera 410 in a first image pickup region 411. The parts 4 the images of which are picked up by the first CCD camera 410 impinge on baffle 401 and are scattered thereby, and the images of the parts are again picked up by second CCD camera 412 in a second image pickup region 413. When the number of falling parts 4 caught by the first CCD camera 410 amounts to the set number as one packaging unit beforehand input by the setting unit 421, a vibration stopping signal is output from the control circuit 20 to the vibration driver 7a. The determining circuit 420 determines whether the parts collected in the hopper 414 should be packaged or not in accordance with the flowchart of a program shown in FIG. 31 on the basis of the number of parts (hereinafter referred to as a first and a second numerical values) obtained on the basis of the numbers of parts obtained by the first and second CCD cameras 410 and 412, respectively.

Figure 31:
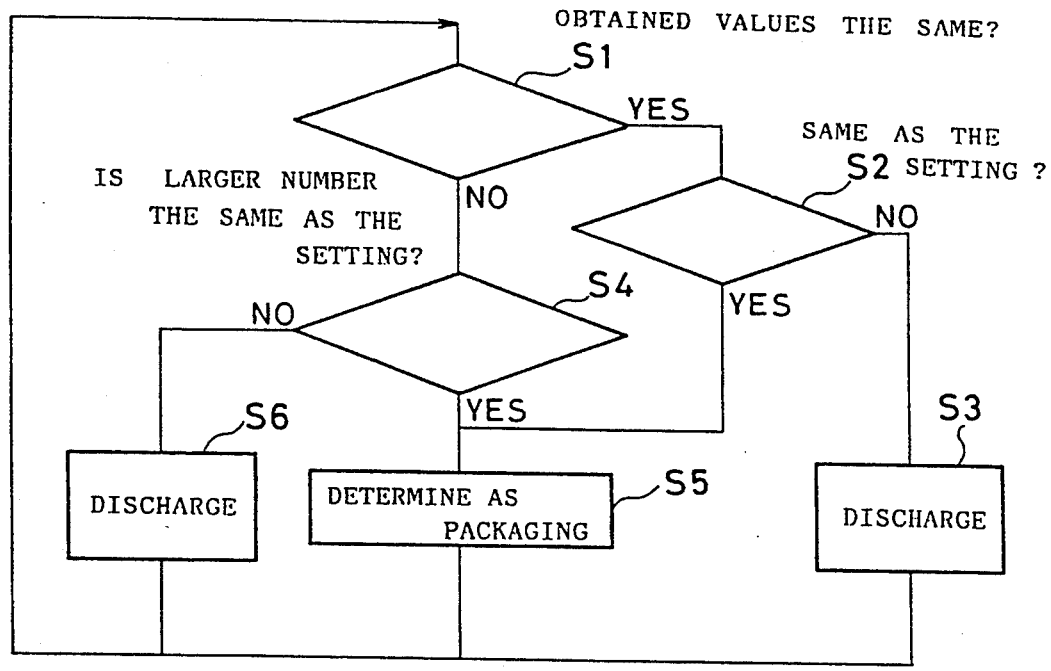
FIG. 31 is a flowchart of a program executed by a determining circuit shown in FIG. 30.

More particularly, in FIG. 31, the determining circuit 420 first determines whether the first and second numerical values are the same (step S1). If so, the determining circuit determines that these values are the same as the set number as the one packaging unit (step S2). If not, the determining circuit determines that the parts in the hopper 414 should not be packaged, but should be discharged (step S3). The result of the determination at step S3 is delivered to the control circuit 20, which delivers an opening signal to the second open/close unit 416. A lid of the second open/close unit 416 is opened by this opening signal to thereby discharge the parts in the hopper 414 to the discharge hopper 419.

If the first numerical value is not the same as the second numerical value at step S1, the determining circuit determines whether the larger one of the first and second numerical values is the same as the set number (step S4). If the larger one of the first and second numerical values is the same as the set number as the result of the determination at step S4, and those numerical values are the same as the set number as the result of the determination at step S2, the determining circuit determines that the parts in the hopper 414 should be packaged (step S5). The result of the determination at step S5 is also delivered to the control circuit 20, which outputs an opening signal to the first open/close unit 415. By this opening signal, the lid of the first open/close unit 415 is opened and the parts in the hopper 414 are discharged to the part receiver 3.

The lid of the discharger 12 is opened by a packaging signal from the control circuit 20 and the parts discharged to the receiver 3 are packaged.

When the larger value is not the same as the set number at step S4, the determining circuit 20 determines that the parts should be discharged as at step S3 (step S6).

The baffle 401 of this embodiment Is provided so as to hinder the falling of parts 4 to thereby scatter the parts falling all of a lump. As other scattering means, a funnel-like trough 26 which has a plurality of passages to divide the falling passage for the parts 4 (shown in FIG. 27) or means such as a tilted ski-like plate for scattering the parts falling all of a lump may be used. Other detecting means may be a one which counts on the basis of reflected signals obtained by a supersonic or optical sensor.

While the present embodiment has two detection regions for the detection means; that is, the first Image pickup region 411 above the baffle 401 and the second image pickup region 413 below the baffle, two or more detection regions may be provided depending on the number of scattering means provided.

Figure 32:
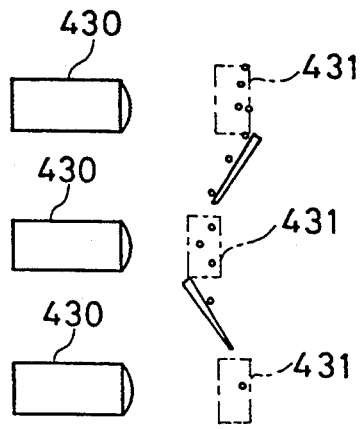
FIG. 32 is a side view of another detection region.

FIG. 32 shows an embodiment where, for example, three detection regions 431 and the three corresponding detection means, for example, optical sensors 430, are provided. Alternatively, arrangement may be such that single detection means counts the number of parts on the basis of image signals from three respective detection regions into which the picked-up image is divided.

As another example of the part fall passageway, a guide may be provided at a position through which small parts fall. The detection means in this case may be provided within the guide.

Figure 33:
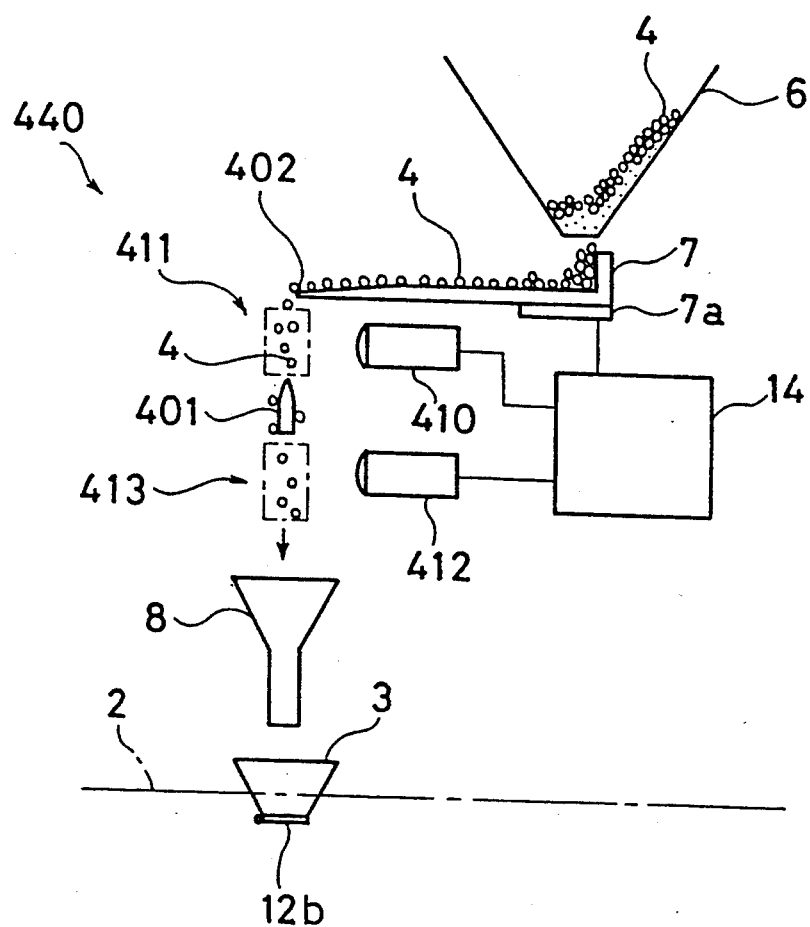
FIG. 33 is a side view of another embodiment of the present invention.
Figure 34:
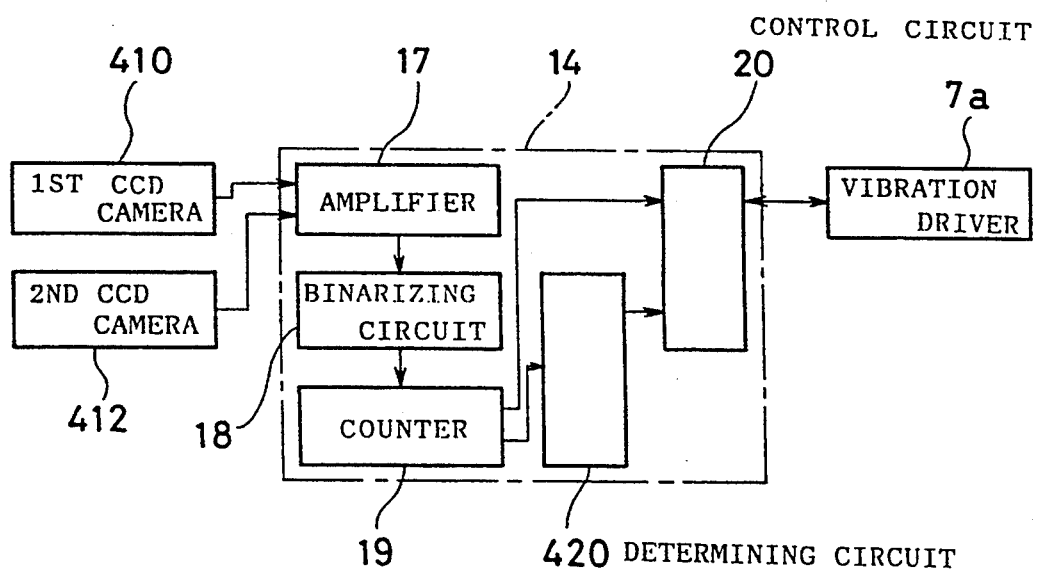
FIG. 34 is a detailed block diagram of an electric system of the operational unit shown in FIG. 33.

An embodiment of the present invention will be described with reference to FIGS. 33, 34 and 35. The operation unit 14 receives image pickup output signals from the first and second CCD cameras 410 and 412 and counts the number of the falling parts. As shown in FIG. 34, the image pickup output signals are amplified by the amplifier 17 and delivered to the binarizing circuit 18. The binarized image pickup output signals for parts 4 are counted by the counter 19 and then fed to the determining circuit 420 and the control circuit 20. When the number of parts counted by the counter 19 amounts to substantially the number of parts to be delivered at a time, the control circuit 20 delivers a vibration stopping signal to the vibration driver 7a. The determining circuit 420 determines the number of parts which have fallen on the basis of the flowchart of FIG. 35.

The operation of the small part counting device having the above structure will be described below. The parts 4 fed from the feed hopper 6 of the part feed unit 440 to the loosening shoot 7 are gradually loosened by the vibration of the shoot 7 and fall from the discharge end 402. The images of the falling parts are first picked up by the first CCD camera 410 in the first image pickup region 411. The parts the images of which are picked up by the first CCD camera 410 impinge on the baffle 401 and are scattered while the images of the parts are also picked up by the second CCD camera 412 in the second image pickup region 413. These image pickup output signals are delivered to the operation unit 14 and the number of parts which have fallen is counted.

In the present embodiment, 10 parts 4 are handled as one collection unit, and sets of about 5 parts which is about half of the collection unit and uneven in the number of parts are fed to respective part receivers 3. Thus, when the number of falling parts 4 amounts to about 5, the control circuit 20 of the operation unit 14 outputs a vibration stopping signal to the vibration driver 7a. The determining circuit 420 determines the number of parts fed into the part receiver 3 on the basis of the number of parts obtained by the first CCD camera 410 (hereinafter referred to as a first numerical value) and the number of parts obtained by the second CCD camera 412 (hereinafter referred to as a second numerical value) in accordance with the flowchart of the program shown in FIG. 35.

Figure 35:
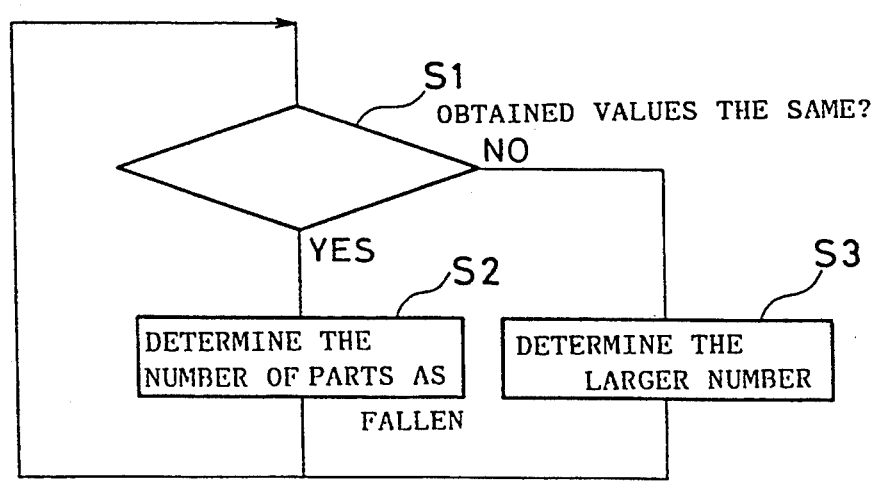
FIG. 35 is a flowchart of a program executed by a determining circuit of FIG. 34.

That is, in FIG. 35, the determining circuit 420 first determines whether the first numerical value is the same as the second numerical value (step S1). If so, the determining circuit determines these values as the number of parts which have fallen (step S2). If not at step S1, the determining circuit determines that the larger one of the first and second numerical values is the number of parts which have fallen (step S3). The result of the determination at steps S2 and S3 are delivered to the control circuit 20.

In this way, the number of parts 4 fed into each of the successive part receivers 3 provided on the recirculating conveyor 2 is specified. Thus, parts 4 the number of which is about 5 are put in each part receiver 3. Since the recirculating conveyer 2 is conveyed in the direction of arrow A, part receivers 3 which have arrived below the part feed unit 440 receive parts 4 sequentially. While the respective part receivers 3 receive a different number of parts 4, the current positions of these part receivers 3 are grasped at all times on the basis of the conveyance speed signals from the encoder 10 (see FIG. 1) provided on the drive shaft of the recirculating conveyer 2.

During movement of the parts to the position where the opening unit 12 (see FIG. 1) is provided which opens the discharger 12a for the receiver 3 since the parts 4 were fed into the part receiver 3, the operation unit 14 performs combinations of respective sets of parts in the part receivers 3 in order to obtain the number of parts as a collection unit for bagging purposes.

When part receivers 3 determined to be combined with each other arrive at the opening unit 12, the parts 4 in the receivers 3 are discharged to the bagging and packaging unit 13 provided below the recirculating conveyor 2 at the position of the opening unit in accordance with an opening signal from the operation unit 14. When the two combined part receivers 3 discharge parts 4, the operation unit 14 outputs a packaging signal to the bagging and packaging unit 13 (see FIG. 1) to thereby close the bag, which is then gathered at a particular place by the gathering conveyor 11 (see FIG. 1). The combination by the operation unit 14 is performed by the method described above using Tables 1 and 2. In place of this embodiment, the arrangement shown in FIGS. 6 and 8 may be used for achieving the same purposes.

The determining circuit then determines whether the combination of the fed parts and other parts already accommodated amounts to a target number of parts. If so, the determining circuit determines the discharge of the combined parts. Another embodiment of a constant-number-of-part collecting device which receives new parts by moving the discharge means when the target number of combined parts is not obtained will be described with reference to FIG. 36.

As described above with reference to Table 2, the constant-number-of-parts collecting device of this embodiment feeds a group of 15 parts or so which is about half of 30 small parts 102 to each of the hoppers 181–186 for collecting such small parts in units of 30 parts.

Figure 36:
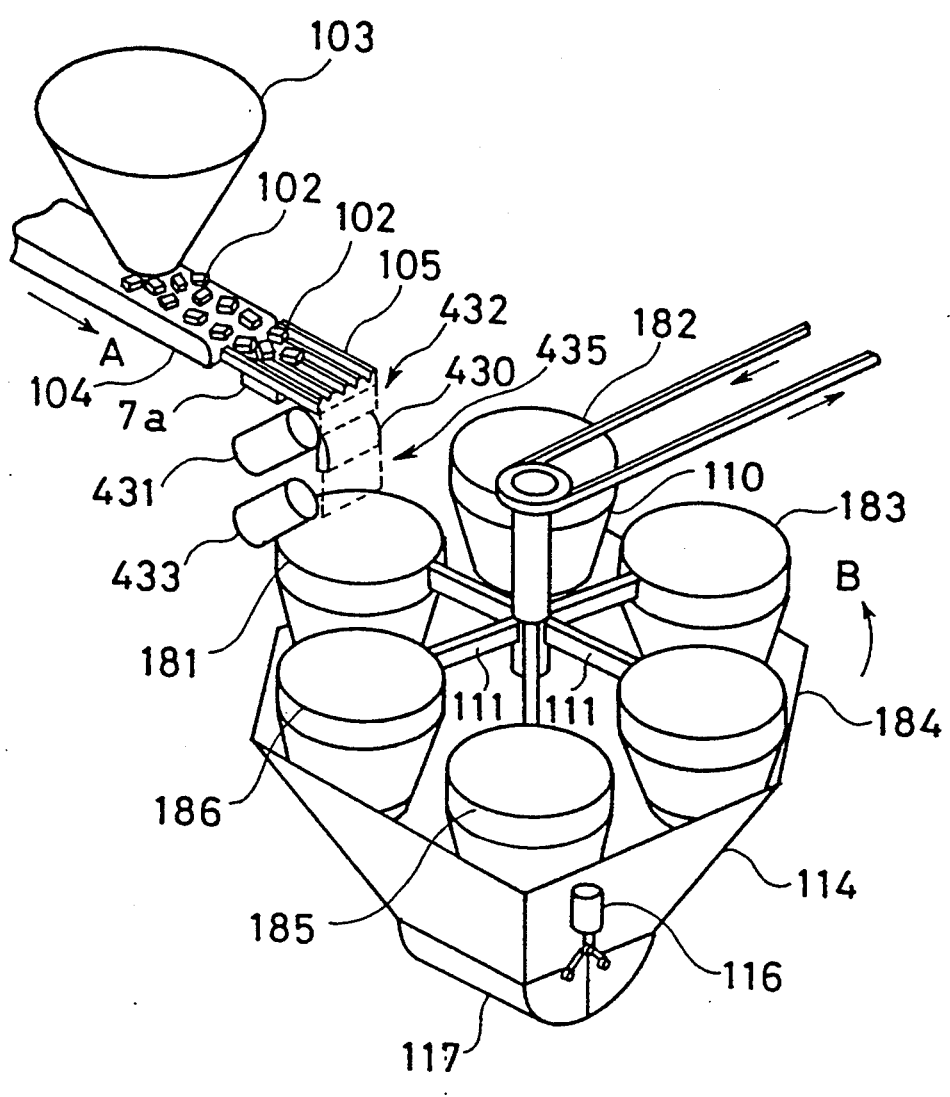
FIG. 36 is a perspective view of another embodiment of the present Invention.

In FIG. 36, a baffle 430 positioned in the passageway for parts 102 falling from the discharge end of the loosening shoot 105 scatters the falling parts 102. The first CCD camera 431 is attached relative to a first image pickup region 432 which is the passageway for the falling parts 102 above the baffle 430 below the discharge end of the loosening shoot 105. It picks up the images of the parts which fall at a time. A second CCD camera 433 uses as a second image pickup region 435 the passageway for the falling parts 102 below the baffle 430 and picks up the images of parts 102 scattered by the baffle 430.

Figure 37:
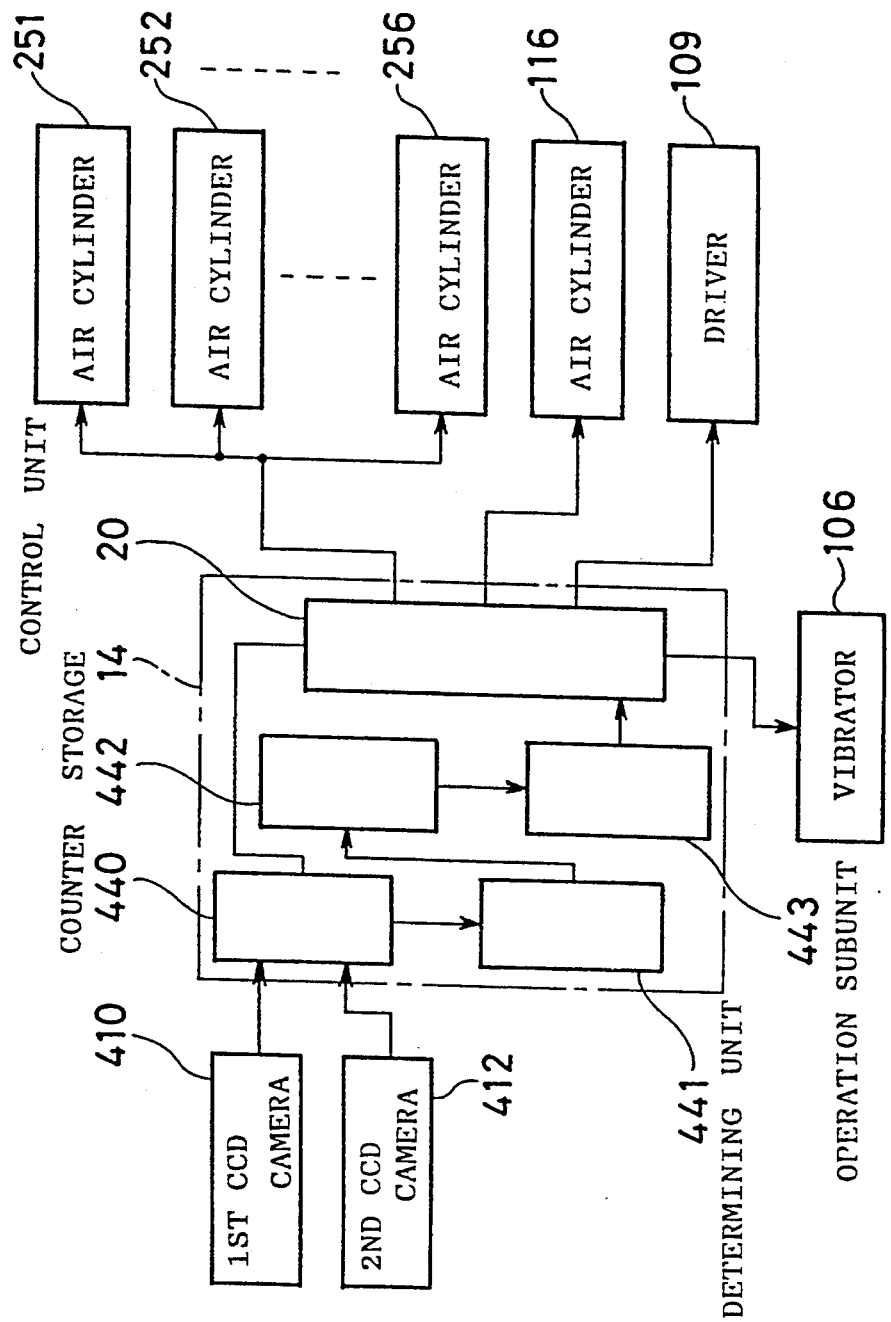
FIG. 37 is a block diagram of an electric system in FIG. 36.
Figure 38:
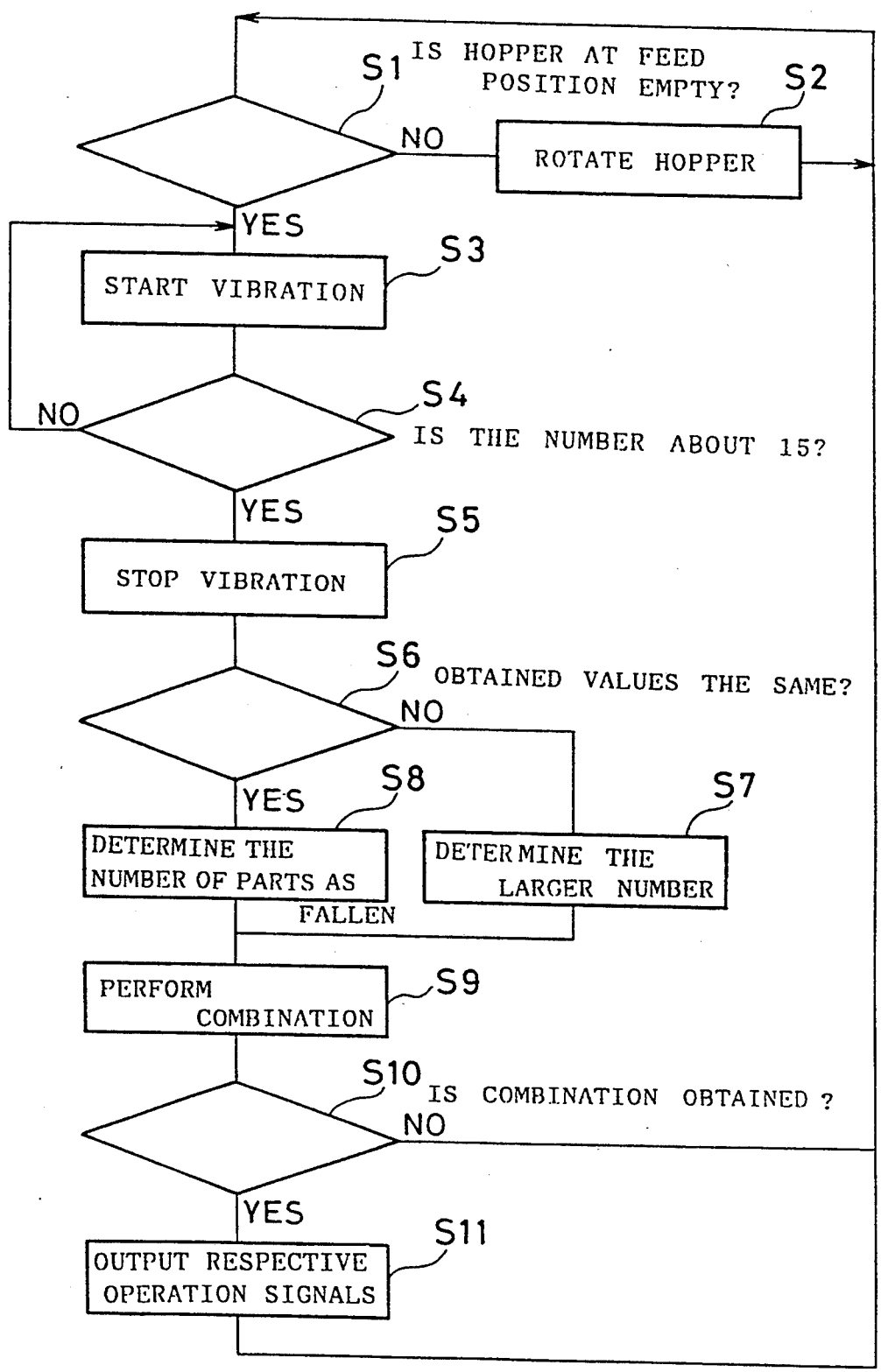
FIG. 38 is a flowchart illustrative of the operation of the embodiment shown in FIG. 36.

As shown in FIG. 37, the operation unit 14 includes a counter 440 which receives the image output signals from the first and second CCD cameras 410 and 412 to count the number of parts falling in the first and second image pickup regions 432 and 435, a determining unit 441 which determines the number of falling parts on the basis of the count obtained in the first image pickup region 432 and counted by the counter 440 and the count obtained in the second image pickup region 435, a storage 442 which stores the respective numbers of parts determined on the basis of the result of the determination by the determining unit 441 (obtained in the same procedure as the program of the flowchart shown in FIG. 38), an operation subunit 443 which combines the respective groups of parts fed from the loosening shoot 105 to the hoppers 181–186 and the number of other parts accommodated already and determines whether the result amounts to a target number, and a control unit 20 which, if the number of parts obtained as the result of the combination by the operation subunit 443 amounts to the target number, outputs an operation signal to the first air cylinders 251–256 (see FIG. 19) to discharge the combined parts, and outputs an operation signal also to the second air cylinder 116 to discharge the target number of parts collected in the collecting hopper 114 for packaging purposes and, if the combined number does not amount to the target number, outputs a rotation signal to the driver 109 of the drive shaft 110. When the hoppers 181–186 rotates in the direction of arrow B by the rotation of the drive shaft 110 and the next one of the hoppers 181–186 is positioned at the discharge end of the shoot 105, the control unit 20 outputs a vibration starting signal to the vibrator 7a of the loosening shoot 105 and, when about 15 parts 102 are fed, outputs a vibration stopping signal.

The operation of the constant-number-of-parts collecting device having the above structure will be described on the basis of the flowchart of FIG. 38.

Assume that parts 102 are already accommodated in the feed hopper 103. If, for example, a hopper 181 positioned at a position below the discharge end of the loosening shoot 105 (hereinafter referred to as a feed position) is empty (step S1), the control unit 20 of the operation unit 14 outputs a vibration starting signal to the vibrator 7a (step S3).

When the vibrator 7a starts to vibrate in response to this signal, the feed conveyor 104 is moved In the direction of arrow A. The parts 102 discharged from the feed hopper 103 and entrained on the feed conveyer 104 are transferred from the feed conveyor 104 to the loosening shoot 105. The mass of parts 102 on the shoot 105 is loosened by vibration to advance along the grooves in the shoot 105 to the discharge end and fall at the feed position. The Images of the falling parts are first picked up by the first CCD camera 431 in the first image pickup region 432 and the image pickup output signals are delivered to the counter 440 for counting purposes. When the number of parts 102 counted amounts to about 15 (step S4), the control unit 20 outputs a vibration stopping signal to the vibrator 7a (step S5).

At the same time, the parts 102 the image of which are picked up by the first CCD camera 431 impinge on the baffle 430 to be scattered and the images of the parts are again picked up by the second CCD camera 433 in the second image pickup region 435. These image pickup output signals are also delivered to the counter 440 for counting purposes. The determining unit 441 determines the number of parts accommodated in the hopper 181 positioned at the feed position on the basis of the number of parts obtained by the first CCD camera 431 (hereinafter referred to as a first numerical value) and the number of parts obtained by the second CCD camera 433 (hereinafter referred to as a second numerical value).

More particularly, the determining unit 441 first determines whether the first numerical value is equal to the second numerical value (step S6). If not, it determines that the larger one of the first and second numerical values represents the number of parts which have fallen (step S7). If the first numerical value is equal to the second numerical value at step S6, the determining unit determines that these numerical values are the number of parts which have fallen (step S8). The number of parts determined by the determining unit 441 is stored in the storage 442.

Since groups of parts uneven in the number of parts are fed from the loosening shoot 105 into the hoppers, the respective numbers of parts in the hoppers are about 15, inclusive of exactly 15. When, for example, 13 parts 107 are fed into hopper 181, the operation subunit 443 of the operation unit 14 performs a combination involving those 13 parts (step S9).

When the target number (30) of parts is obtained as a result of combination of the group of 13 parts in the hopper 181 and any one of groups of the parts in the hoppers 182-186 except for hopper 181 (step S10), the control unit 20 outputs an operation signal to the first air cylinders 251-256 (see FIG. 19) in order to discharge the parts in the appropriate hopper to the collecting hopper 114. When the first air cylinders 251-256 corresponding to the release mechanisms 231-236 (see FIG. 19) for the hoppers 181-186 start to operate, the combined groups of parts are discharged to the collecting hopper 114. Thereafter, the control unit 20 outputs an operation signal to the second air cylinder 116 of the collecting hopper 114 (step S11). As a result, the lower end 117 of the collecting hopper 114 is opened to discharge the parts to package the parts the number of which has amounted to the target number of 30.

When no satisfactory combinations are obtained and the 30 parts are discharged, the operation unit determines whether the hoppers 181-186 at the feed position are empty. If not, the control unit 20 outputs a rotation signal to the driver 109. When the driver 109 is operated by this signal, the drive shaft 110 is rotated in the direction of arrow B to thereby index the hoppers 181-186 by a distance corresponding to one hopper (step S2). Thereafter, similar operations are repeated.

The combination in the operation subunit 443 is performed similarly to the manner described with reference to Table 3 and FIG. 21.

While in the present embodiment the loosening shoot 105 is provided at the feed conveyor 104, arrangement may be such that the parts fall from the discharge end of the feed conveyor 104 and are scattered by the scattering means with the loosening shoot 105 being removed.

While in the present embodiment the two image pickup regions are provided; namely, the first image pickup region 432 above the baffle 430 and the second image pickup region 435 below the baffle, more detection regions may be provided depending on the number of scattering means provided, as shown in FIG. 32. Also, in this case, arrangement may be such that single detection means counts the number of parts on the basis of the image signals from three respective regions into which the picked-up image is divided.

As another embodiment of the fall passageway, a guide may be provided at the position where small parts fall. In this case, the detection means may be attached within the guide.

As another embodiment, two feed positions may be set where parts are fed into the discharge means such that substantially the target number of parts is fed at one feed position while a few parts are fed at the other position.

A group of parts the number of which is about 90% of the target number and one or more parts which are a deficiency may be combined.

If a satisfactory combination of groups of parts is not obtained even if the respective groups of parts 102 may be fed into all the hoppers 181-186 as the discharge means, the groups of parts the numbers of which are the remotest from each other among all the groups of parts may be forcedly discharged. Alternatively, all the sets of parts may once be discharged and combination may be restarted from the beginning.

Figure 39:
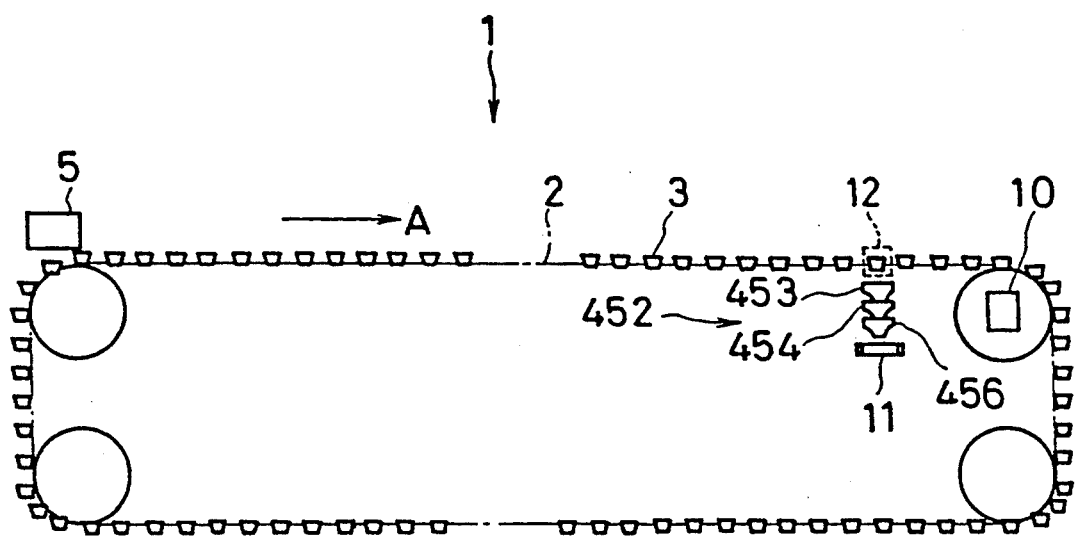
FIG. 39 is a side view of another embodiment of the present invention.
Figure 41:
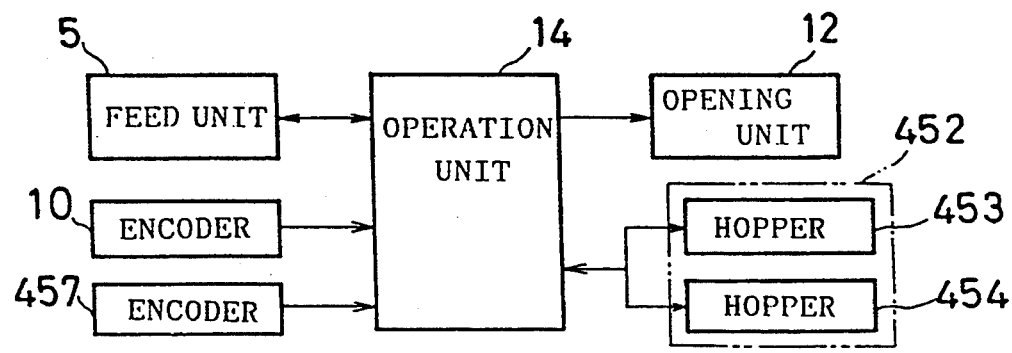
FIG. 41 is a block diagram of an electric system in FIG. 39.

A further embodiment of the present invention will be described with reference to FIGS. 39-41. A collection device 452 is provided as means for receiving parts 4 discharged from the part receiver 3 and temporarily accommodating a group of parts as the collection unit below the recirculating conveyor 2. As shown In FIGS. 39 and 40, the accommodating device 452 includes a first and a second hoppers 453 and 454 openable at a lower end to feed parts Into a part case 451 of the part conveyor 11 synchronously with the movement of the part case 451, and a shoot 456. A second encoder 457 (see FIG. 1) is attached to the driver (not shown) of the part conveyor 11 to position the part cases 451 intermittently below the shoot 456.

Since the respective positions of the part receivers 3 are successively grasped by the signals indicative of the speeds of the conveyor 2 received from the encoder 10, it is known which part receiver 3 Is at a position where It faces the opening unit 12. When the part receiver 3 to be opened at the accommodating device 452 is determined as the result of combinations performed by the operation unit 14, the operation unit 14 outputs an opening signal each time the determined part receiver 3 is conveyed to a position beside the opening unit 12. Each time the number of parts 4 discharged to the accommodating device 452 amounts to the number as the preset collection unit, or each time the combined sets of part receivers 3 are released, the operation unit 14 outputs an open/close signal to the first hopper 453 or the second hopper 454 of the accommodating device 452 to discharge the temporarily accommodated parts in such hopper. The opening signal to the second hopper 454 is output by confirmation of the positioning of the part case 451 below the shoot 456 on the basis of the conveyance signal from the second encoder 457.

The operation of the present embodiment will be described below. When the respective part receivers 3 the combination of which is determined are moved to the opening unit 12, the parts 4 in the respective part receivers 3 are discharged to the temporarily accommodating device 452 provided below the recirculating conveyor 2 at the position of the opening unit 12 in accordance with the opening signal from the operation unit 14. When all the parts 4 are discharged from the combined two part receivers 3, the operation unit 14 outputs an opening signal to the first hopper 453 or second hopper 454 of the accommodating device 452 to accommodate the parts in the first hopper 453 or second hopper 454 for temporary detention before discharge of the parts into the part case 451 of the part conveyor 11.

Figure 40A:
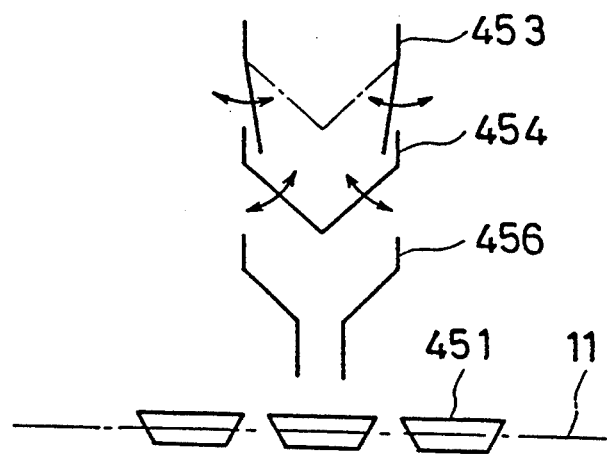
FIG. 40 illustrates an accommodating device of FIG. 39.
Figure 40B:
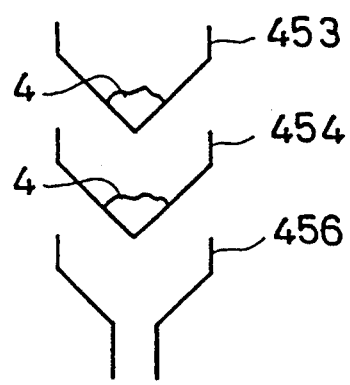
Figure 40C:
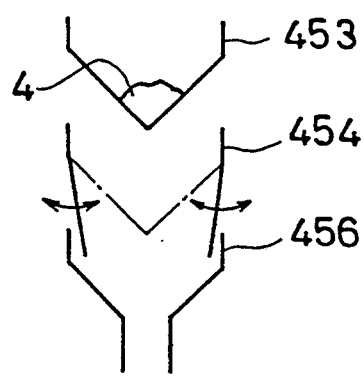

Which of the first hopper 453 and the second hopper 454 should accommodates the parts is determined by an open/close signal from the operation unit 14. Specifically, as shown in FIG. 40, if no parts have been accommodated in any of the first and second hoppers 453 and 454, the combined parts are accommodated in the second hopper 454 with the first hopper 453 being left open (FIG. 40(a)). When the parts have been accommodated only in the second hopper 454, the combined parts are accommodated in the first hopper 453 (FIG. 40(b)). Until the parts are accommodated into both of the first and second hoppers 453, 454, the part case 451 is positioned below the shoot 456. Thus, by an opening signal from the operation unit 14, the second hopper 454 is opened to thereby discharge the temporarily detained parts therein into the part case 451, as shown in FIG. 40(c).

The combination by the operation unit 14 is performed in a manner similar to that performed with reference to Table 1 and FIG. 5. The specified operation of the embodiment of FIGS. 39-41 will be described below in more detail with reference to Table 1 and FIG. 5. The sets of parts of a combination 1a are accommodated in the second hopper 454 of the accommodating device 452 while the parts of a combination 2a are accommodated in the first hopper 453. When a part case 451 of the part conveyor 11 is positioned below the shoot 456 in the meantime, the parts of the combination 1a accommodated in the second hopper 454 are discharged into the part case 451.

The respective sets of parts of the combinations thus determined are sequentially discharged in the sequence of conveyance. The specified temporary detaining process performed thereafter by the accommodating device 452 will be described next. When the combined sets 1a of parts are discharged, they are discharged into the second hopper 454 with the first hopper 453 being open, as shown in FIG. 40(a), and they are temporarily detained until the part case 451 of the part conveyor 11 is positioned in place. When the next combined sets 2a of parts are discharged, the first hopper 453 is closed by an instruction from the operation unit 14, as shown in FIG. 40(b), and the combined sets 2a of parts are accommodated in the first hopper 453. By the time when the combined sets 3a of parts are conveyed to the shoot 456, the part case 451 of the part conveyor 11 is positioned below the shoot 456, and the target number of parts in the second hopper 454 is fed into the part case 451, as shown in FIG. 40(c).

If the next part case 451 is positioned by the time when the combined sets 3a of parts are carried to the shoot, the parts in the first hopper 453 are directly discharged into the part case 451. If the combined sets 3a of parts are discharged by the time when the next part case 451 is positioned below the shoot 456, the operation unit 14 outputs to the second hopper 454 a signal to close same and an opening signal to the first hopper 453. Thus, the combined sets 2a of parts in the first hopper 453 are discharged into the second hopper 454 and temporarily detained there and the combined sets 3a of parts are accommodated in the first hopper 453.

Figure 42:
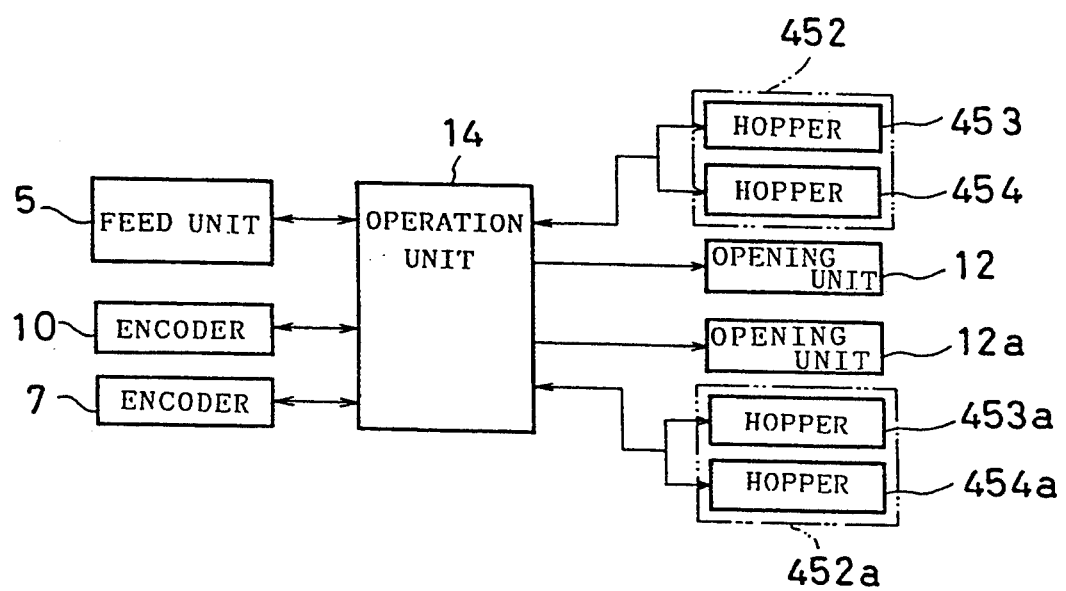
FIG. 42 is a block diagram indicative of an electric system of another embodiment of the present invention.

As another embodiment, two accommodating devices may be provided to package a constant number of parts more efficiently, as shown in the electrical block diagram of FIG. 42.

That is, two opening units 12, 12a and accommodating devices 452, 452a are provided and hence two part conveyors are provided accordingly.

Table 2 and FIG. 7 show the result of such combination and the storage state of the storage positions P11 to P1 in the operation unit 14.

In the case of the present embodiment, determination is made such that 4 parts in the first counting sequence and 6 parts in the second counting sequence are discharged as a combined set 1b to one accommodating device 452 while 5 parts in the fourth counting sequence and 5 parts in the fifth counting sequence are discharged as a combined set 1c to the other accommodating device 452a. Since the combined sets 1b and 1c of parts are different in discharge position, 7 (parts) in the seventh counting sequence and input to the storage position P11 is combined with 3 (parts) in the third counting sequence and stored at the storage position P7, as shown in FIG. 7. As a result, those parts may be discharged as a combination 2b to the one accommodating device 452.

Figure 43:
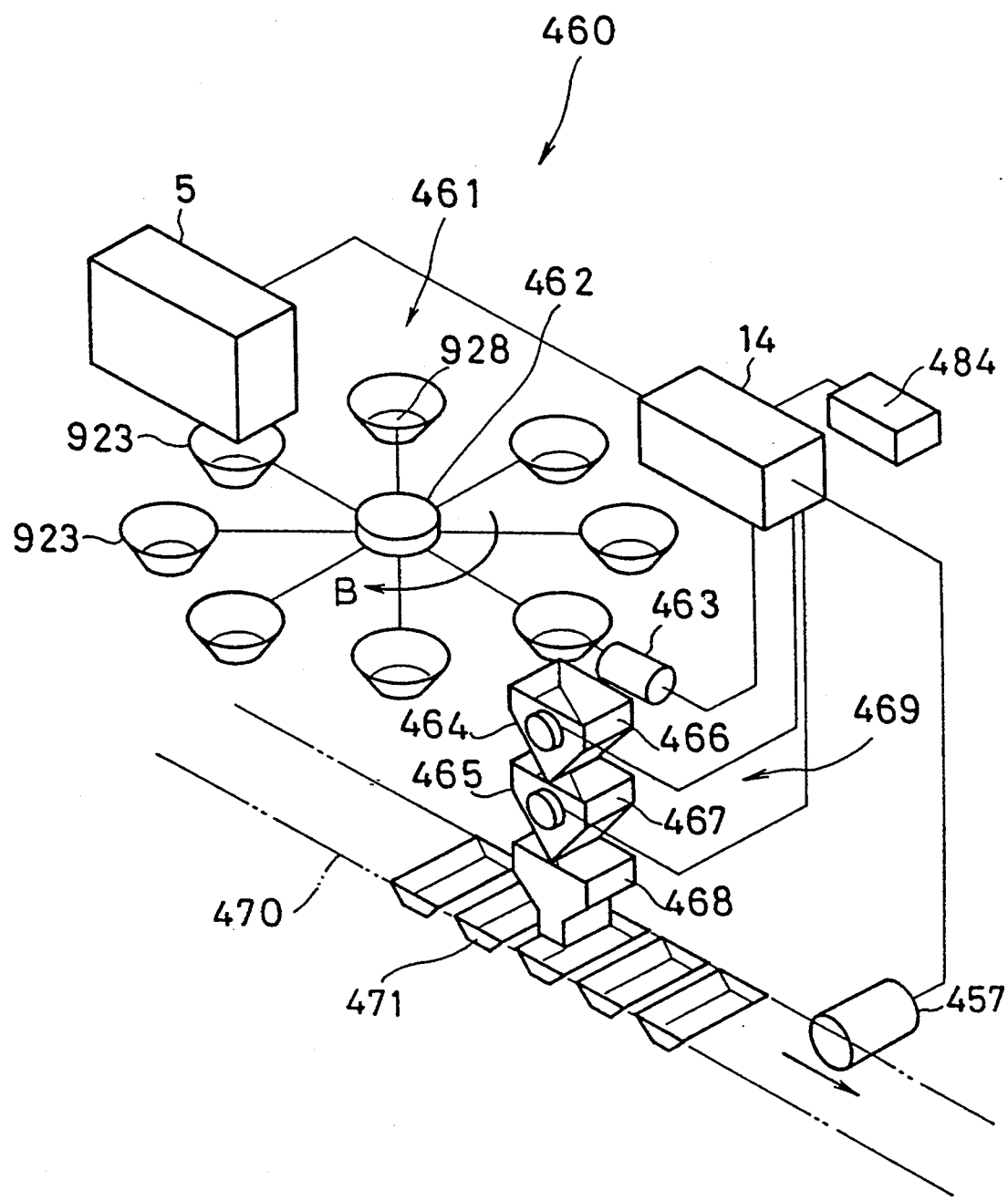
FIG. 43 is a perspective view of another embodiment of the present invention.

FIG. 43 shows a constant-number-of-parts collecting device 460 which employs a rotating distribution hopper 461 as distributing means. It includes the feed unit 5 shown in FIG. 1 which feeds articles of a smaller quantity than the target quantity of articles (in this case, the total weight of the fed articles may be measured by a weight meter and may be used as a unit.), a rotating distribution hopper 461 which rotates the articles fed by the feed unit 5 in the direction of arrow B and distributes those articles selectively during the rotation; a tracing unit 462 which traces the position of a set of articles fed by the feed unit 5 In correspondence to the move of the hopper 461; an operation unit 14 which combines at least two units of articles to obtain a target number of articles as the preset collection unit; a discharge unit 463 for causing the hopper 461 to discharge the combined articles as the target quantity as the result of the combination by the operation unit 14; an accommodating device or shoot 468 which temporarily accommodates the target quantity of articles discharged from a discharge device 469 which includes upper and lower temporary detaining hoppers 466 and 467 which have lower open/close means 464 and 465, respectively; and a conveyor 470 which receives the target quantity of articles fed from the accommodating device 468 synchronously with the conveyance of the plurality of successive receivers 471 provided on the conveyer.

In the case of the constant-quantity-of-parts collecting device for parts, screws or the like conveyed to the position where articles are assembled, the conveyor unit 470 returns with empty receivers 471 so as to receive a target quantity of parts.

In order to obtain a sales unit as a packaged constant number of screws or the like or a sales unit as a packaged constant weight of pet foods, a bagging and packaging unit may be provided adjacent to the passageway of the conveyor 470.

In the case of the constant weight package, sets of articles to be combined are obtained easily by providing an allowance range for the target weight. Kinds of bolts and nuts or screws and washers sold generally as a set may be counted and combined. In that case, the temporary accommodating means is temporarily detained until a target number of articles of kinds is obtained.

One preferred embodiment of the constant-weight-of-articles collecting device according to the present invention will be described below with reference to FIGS. 1, 3, 39, 40 and 44.

While groups of articles 4 are conveyed on the recirculating conveyor 2, the operation unit 14 which combines the respective weights of at least two units or sets of these articles 4 in the receivers 3 to obtain a target weight as the preset collection unit and discharges the target weight of articles selectively to the accommodating device 452 Is provided in the vicinity of the conveyor 2 (see FIG. 1).

Figure 44:
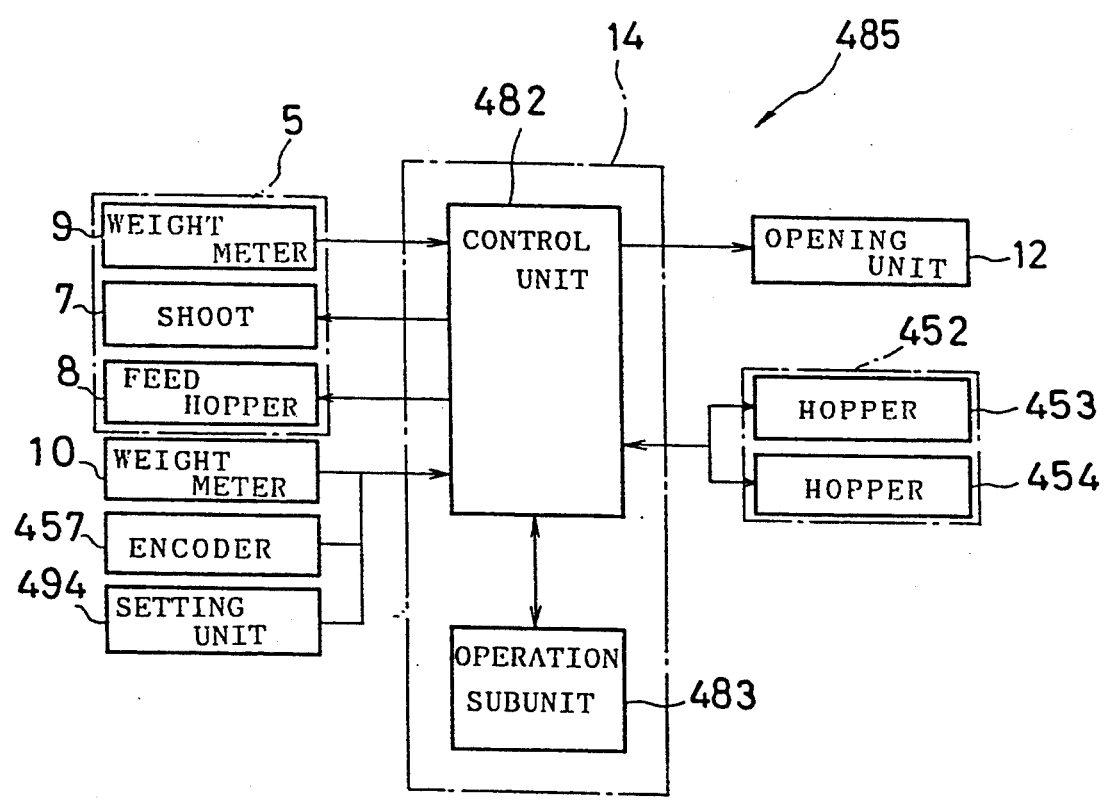
FIG. 44 is a block diagram of an electric system of another embodiment of the present invention.

The operation unit 14 is composed of a control unit 482 and an operation subunit 483, as shown in FIG. 44. The control unit 482 outputs a vibration starting signal to the loosening shoot 7 in order to feed articles 4 to a receiver 3 on the conveyor 2 on the basis of the conveyance speed signal from the first encoder 10, receives from a meter 9 a signal indicating the quantity of articles 4 fed to the feed hopper 8 and measured by the meter 9 and, when a set of articles of a quantity close to the preset quantity is obtained, outputs a vibration stopping signal to the loosening shoot 7. When the feed hopper 8 which accommodates the fed articles 4 is opened, and the articles 4 are fed to an empty receiver 3, data on the weight of the fed articles 4 in the receiver 3 is stored in the operation subunit 483 in correspondence to the receiver 3. Thus, after the articles 4 in the receiver 3 are discharged, the receiver is grasped as an empty one like the empty receiver before it receives articles 4. The respective positions of the receivers 3 are successively grasped by the signals indicative of the speeds of the recirculating conveyor 2 from the encoder 10, so that it is known which receiver 3 is at a position where it faces the opening unit 12.

The operation subunit 483 combines at least two groups of articles 4 on the basis of a target weight and an allowance for the target weight set by the setting unit 494 as the setting means in order to obtain the target weight. When the receiver 3 to be opened at the accommodating device 452 is determined as a result of the combination obtained by the operation subunit 483, the control unit 482 outputs an opening signal to the opening unit 12 each time the determined receiver 3 is carried laterally of the opening unit 12.

Each time the total weight of articles 4 discharged to the accommodating device 452 amounts to the collection unit beforehand set, or each time the combined sets of receivers 3 is opened, the control unit 482 outputs an opening signal to discharge the parts accommodated temporarily to the first hopper 453 or second hopper 454 of the accommodating device 452. The control unit 482 outputs the opening signal to the second hopper 454 by confirming the positioning of the part case 451 below the shoot 456 on the basis of the conveyance signal from the second encoder 457.

The operation of the constant-weight-of-articles collecting device 485 having the above structure will be described below. The articles 4 fed to the shoot 7 in units of a small quantity from the feed shoot 6 of the feed unit 5 are gradually loosened to flow down into the feed hopper 8 as the result of vibration of the loosening shoot 7 by a vibration starting signal from the control unit 482 of the operation unit 14. The weight of the set of articles 4 sequentially falling into the feed hopper 8 is measured by the meter 9 and data on the total measured weight of the articles 4 is delivered to the control unit 482 at each time of measurement. The control unit 482 beforehand stores data on a one-time feed quantity from the setting unit 484 and, when data on substantially the weight of the above-mentioned feed quantity of articles is fed to the feed hopper 8, outputs a vibration stopping signal to the loosening shoot 7.

In the present embodiment, 100 g of a set of articles 4 is handled as a target weight which is one collection unit and has an allowance of +5 g set. The respective sets of articles, where one set of articles may differ in total weight from another set of articles but the weight of each set of articles is about 50 g which is about half of the collection unit of 100 g, are fed as a one-time feed quantity to receivers 3. That is, the setting unit 484 sets a target weight of 100 g, an allowance of +5 g, and a one-time feed quantity of 50 g in the control unit 482.

The specified combining operation will be described below. The storage positions for combinations stored in the operation unit 483 are shown in FIG. 45. The quantities of sets of articles 4 accommodated in receivers 3 and the sequences of conveyance or measurement are listed in Table 4.

The operation unit 483 has 11 storage positions P1–P11 set therein. Each time measurement is made, data on the respective stored weights of sets of parts 4 are shifted sequentially from P11 to P10, P10 to P9, and so on on the basis of the conveyance signals from the first encoder 10. Each time such a shift is made, data on the total weight of parts input to P11 and data on the respective weights measured so far and stored already at the storage position P10 to P1 are combined and checked whether the total combined weight satisfies the collection unit of 100 g or an allowance of +5 g (hereinafter referred to as target values).

The operation unit first determines whether a receiver 3 Is empty or data on a weight corresponding to that receiver 3 is stored or not. If the receiver 3 is empty, articles 4 are fed into the receiver 3 from the feed hopper 8, at which time, for example, 51.4 (g) in the first measuring sequence is stored at P11 from Table 1. Since nothing is stored at P10 to P1, no combination is performed.

TABLE 4

| Measuring sequence | (1) | (2) | (3) | (4) | (5) |
|---|---|---|---|---|---|
| Group of articles | 51.4 | 48.5 | 53.5 | 54.0 | 51.3 |
| Comb. sequence | | 1a | 1a | 2a | |
| Measuring sequence | (6) | (7) | (8) | (9) | (10) |
| Group of articles | 47.3 | 51.6 | 50.5 | 49.4 | 46.9 |
| Comb. sequence | 2a | 3a | 3a | | |
| Measuring sequence | (11) | (12) | (13) | (14) | (15) |
| Group of articles | 48.5 | 52.2 | 52.2 | 50.4 | 53.9 |
| Comb. sequence | 4a | 4a | 5a | 5a | 6a |
| Measuring sequence | (16) | (17) | (18) | (19) | (20) |

TABLE 4-continued

| Group of parts | 56.0 | 50.8 | 55.8 | 54.2 | 47.9 |
|---|---|---|---|---|---|
| Comb. sequence | | 6a | | 7a | 7a |

Weight data of 51.4 (g) at the storage position P11 is shifted to the storage position P10 and 48.5 (g) in the second measuring sequence is stored at an empty storage position P11.

The operation unit then adds 48.5 (g) at the storage position P11 and 51.4 (g) at the storage position P10 and checks whether the resulting value satisfies the target value. As a result of the combination, the value is 99.9 (g), so that it does not satisfy the target value and the operation unit determines that there were no desired combinations this time.

Then, 51.4 (g) stored at the storage position P10 is shifted to a storage position P9; 48.5 (g) at the storage position P11 to an empty storage position P10; and 53.5 (g) in the third measuring sequence to an empty storage position P11. Thereafter, the operation unit checks whether the target value is obtained by a combination of 53.5 (g) stored at the storage position P11 and another weight value. Thus, 53.5 (g) at the storage position P11 and 48.5 (g) at the storage position P10 are combined. Since the result of the combination shows the value of 102, which satisfies the target value, 48.5 and 53.5 (g) in the second and third measuring sequences, respectively, are determined as the first combination 1a.

Then, 51.4 (g) at the storage position P9 is shifted to the storage position P8; 48.5 (g) at the storage position P10 to the storage position P9; 53.5 (g) at the storage position P11 to the storage position P10; and 54.0 (g) in the fourth measuring sequence is input to an empty storage position P11. In the present embodiment, a single accommodating device 452 is provided for discharging the combined sets of articles. Therefore, a different combination of two sets of articles 4 between which the already satisfactory combined sets of articles 4 exist is not determined and no further combination with 51.4 (g) at the storage position P8 is performed. Therefore, there is no set of articles 4 to be combined with 54.0 (g) at the storage position P11, and the value of the weight of a new set of articles 4 is stored at the storage position P11.

After the respective weight values stored at the storage positions P11-P9 are shifted, 51.3 (g) in the fifth measuring sequence is input to the storage position P11, as shown in Table 4. The value of 51.3 (g) at the storage position P11 is combined with 54.0 (g) at the storage position P10 which is not yet determined as being combined, and the total weight value is 105.3 (g), which does not satisfy the target value, and 47.3 (g) in the sixth measuring sequence is stored at the storage position P11. Then, 47.8 (g) at the storage position P11 is combined with 51.3 (g) at the storage position P10. The resulting total value is 98.6 (g) which does not satisfy the target value. Therefore, 47.3 (g) at the storage position P11 is, in turn, combined with 54.0 (g) at the storage position P9. The result of the combination is 101.3 (g) which satisfies the target value. Therefore, 54.0 (g) in the fourth measuring sequence and 47.3 (g) in the fifth measuring sequence are determined as a combination 2a. In this way, combinations are sequentially determined.

The sets of articles 4 of the combination 1a are accommodated in the second hopper 454 of the accommodating device 452 while the combination 2a is accommodated in the first hopper 453. When a part case 451 of the conveyor 11 is positioned below the shoot 456 in the meantime, the set of articles 4 accommodated in the second hopper 454 of the combined set 1a is discharged into the part case 451.

TABLE 5

| Measuring sequence | (1) | (2) | (3) | (4) | (5) |
|---|---|---|---|---|---|
| Group of articles | 54.1 | 48.8 | 53.5 | 54.0 | 51.3 |
| Comb. sequence | 1b | 1c | 1b | 1c | 2b |
| Measuring sequence | (6) | (7) | (8) | (9) | (10) |
| Group of articles | 47.3 | 51.6 | 50.5 | 49.7 | 46.9 |
| Comb. sequence | | 2b | 2c | 3b | |
| Measuring sequence | (11) | (12) | (13) | (14) | (15) |
| Group of articles | 48.5 | 52.2 | 52.2 | 50.4 | 53.9 |
| Comb. sequence | | 2c | 3b | 3c | 3c |
| Measuring sequence | (16) | (17) | (18) | (19) | (20) |
| Group of parts | 56.0 | 50.8 | 55.8 | 54.2 | 47.9 |
| Comb. sequence | 4c | 4b | | 4b | 4c |

As another embodiment, two accommodating devices similar to those shown in FIG. 42 may be provided to perform more efficient constant weight packaging.

That is, two opening units 12, 12a and accommodating devices 452, 452a may be provided and hence two corresponding conveyors may be provided accordingly.

Table 5 and FIG. 46 show the result of such combination and the storage states at the storage positions P11-P1 in the operation unit 14.

In the case of the present embodiment, 51.4 (g) in the first measuring sequence and 53.5 (g) in the third measuring sequence are determined as a combination 1b to be discharged to one accommodating device 452 while 48.5 (g) in the second measuring sequence and 54.0 (g) in the fourth measuring sequence are determined as a combination 1c to be discharged to the other accommodating device 452a. Since the combinations 1b and 1c differ in discharge position, different combined sets of articles between which the already combined satisfactory sets of articles 4 exist can be determined, as shown in FIG. 46.

As described above with reference to FIG. 8, two positions may be provided where two sets of articles 4 are fed to corresponding receivers 3 and two positions where the combined sets of articles are discharged may be provided to perform the above-mentioned constant weight collection. By doing so, a plurality of collection units are set. For example, if the collection units are 100 and 200 g, 100 or 200 g of articles is bagged by feeding parts in units of about 50 g into receivers 3.

Figure 47:
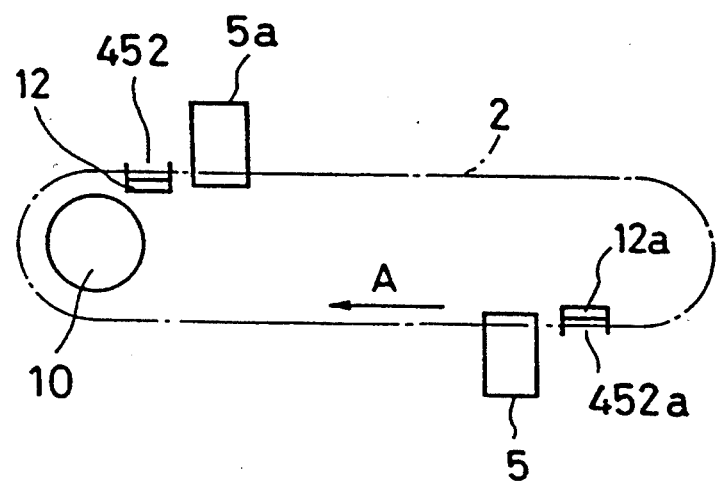
FIG. 47 is a schematic plan view of another embodiment of the present invention.

As shown in FIG. 47, in the present embodiment, the articles fed by the feed unit 5 are conveyed in a recirculating manner in the direction of arrow A. A combination is performed by the operation unit 14 to determine the weight of combined sets of articles which is the target weight by the time when the opening unit 12 provided upstream of the second feed unit 5a is passed through. Each time the respective determined sets of articles arrive at the opening unit 12, they are discharged into the accommodating device 452 by the operation of the opening unit 12. Thus, the position of article accommodation on the recirculating conveyor 2 which is emptied by discharge of the articles is grasped by the operation unit 14 through the first encoder, and new articles are fed selectively from the second feed unit 5a provided downstream of the opening unit 12. The respective sets of articles which are not determined as a combination and a set of newly fed articles are combined by the time when they pass through the second opening unit 12a provided downstream of the second feed unit 5a and upstream of the feed unit 5, and the resulting combined sets of articles are discharged into the second accommodating device 452a by the actuation of the second opening unit 12a.

Alternatively, sets of articles, where one set of articles is different in total quantity from another set of articles but all sets of articles are close in total quantity to 1/N (N=3, 4, 5 . . .) of the required collection unit, may be discharged into the respective receivers 3. Alternatively, in order to package 100 g of articles, for example, a quantity of articles close to, but not exceeding, 100 g as the target weight may be fed by the first feed means while several grams of articles for a deficiency may be fed by the second feed means.

A set of articles of about 90% of the target weight and one or more of articles for a deficiency may be combined.

Sets of articles which are not determined as a combination may be once discharged and a new set of articles 4 may be fed instead. Alternatively, the respective sets of articles which are not at all used for combination may be again combined with a set of new articles 4 fed into an emptied receiver 3. This modification may be achieved also by the devices shown already in FIGS. 22-25.

While the embodiment for combining the weight data which is input at the storage position P11 and the weight data at another storage position has been disclosed, the present invention is not limited to it. All $_nC_r$ combinations for combination patterns may be employed which are what is called a general combination.

The mechanism shown in FIG. 43 may be used as a constant-weight-of-articles collecting device, which includes a feed unit 5 which feeds a set of articles the total weight of which is less than the target weight for collection; a setting unit 484 which sets a target weight and an allowance for the target weight; a rotating distribution hopper 461 which rotates the respective sets of articles fed by the feed unit 5 in the direction of arrow B and selectively distributes the respective sets of articles during the rotation; a tracer 462 which traces the positions of the sets of articles 928 fed by the feed unit 5 in correspondence to the move of the hopper 461; an operation unit 14 which outputs to the feed unit 5 a feed command to feed a set of articles to the position of an empty rotating distribution hopper 461 corresponding to data on the absence of articles on the basis of data on the current positions of the sets of articles 928 from the tracer 462, controls the feed unit 5 to feed to the empty position a set of articles in a range of deficiency for the target weight in consideration of the weight of the set of articles 928 carried by the distribution hopper 461 and not yet determined as being combined to obtain the target weight when the feed command is given to the feed unit 5 to feed articles to the position of the empty hopper 461, combines at least two sets of articles 928 to obtain the target weight as the preset collection unit, and discharges them selectively to the accommodating device 469; a discharge unit 463 which discharges the combined sets of articles 928 as the target weight, obtained as the result of combination by the operation unit 14, from the hopper 923 of the distribution hopper 461; an accommodating device 469 which includes an upper and a lower temporary detention hoppers 466 and 467 which have lower open/close means 464, 465 which temporarily accommodates the target weight of articles discharged by the discharge device 469; and a conveyer unit 470 which has a series of receivers 471 which successively receives target weights of articles fed by the accommodating device 469 synchronously with the conveyance of the series of receivers 471.

The conveyance device 470 is conveyed to a packaging device (not shown) and returns with empty receivers 471.

The operation of the constant-weight-of-articles collecting device of the present embodiment will be described on the basis of the control of the operation unit 14. When the loosening shoot is vibrated by a vibration starting signal, articles are scattered and fed into the feed hopper. The fed articles are measured by the weight meter. It is determined whether a weight close to the target weight to be fed is attained by receiving a signal indicative of the measured weight. When a value close to the target weight is obtained, a vibration stopping signal is output to the loosening shoot.

The operation unit 14 checks on the basis of a tracing signal from the tracing unit 462 whether the hopper 923 is positioned below the feed hopper. The operation unit 14 also determines whether the positioned hopper 923 is empty. If so, it outputs an opening signal to the feed hopper to thereby cause articles 928 to be fed into this empty hopper 923.

The operation unit 14 performs a combining operation of the weight of the fed articles 928 and the weight of articles 928 already received in another hopper 923. If the desired combination is obtained, it determines the combination as such. The combined sets of articles 928 determined is discharged into the accommodating device 469 even during operation of the operation unit 14. When the operation unit 14 recognizes that the combined hoppers 923 have arrived at the position where the discharge unit 463 is provided, on the basis of the rotation of the rotating distribution hopper 461 in the direction of arrow B, the operation unit 14 outputs a discharge signal to the discharge unit 463 to thereby actuate the discharge unit 463 and hence open the bottom of the hopper 923 to thereby discharge articles 928 into the accommodating device 469.

The emptied hopper 923 is grasped as such by the operation unit 14 and rotated so as to receive articles again.

If no desired combinations are obtained, the weight required for obtain a combination is calculated. For example, if about 50 g of articles 928 is fed in order to obtain 100 g of articles as a combination, and it is grasped that either a weight of 50 g or more has been fed or only a weight of 50 g or more remains, operation is performed so as to feed 50 g or less of articles 928. The operation unit 14 controls the timing at which a vibration stopping signal is output from the operation unit 14 to the loosening shoot such that it is output before the measurement signal from the meter indicates a value exceeding 50 g.

In order to package a constant number of screws or the like or a constant weight of pet foods or the like as a sales unit, a bagging and packaging device may be provided adjacent to and on the conveyance passageway of the conveyer unit 470.

In the case of the constant weight packaging, desired combined sets of articles are obtained easily by providing an allowance for the target weight.

In the constant weight collecting device for articles of the same weight such as nails or medicine tablets, an allowance for the target weight set by the setting means may be zero.

A set of bolts and nuts or a set of screws and washers sold may be obtained by counting a plurality of kinds of volts, nuts or screws or washers and combining some of them. In that case, the operation of the temporary accommodating means is temporarily detained until the plurality of kinds of target numbers of these parts are obtained.

As described above in detail, according to the present invention, any uneven quantities of articles smaller in quantity than a collection unit are conveyed and combined to thereby eliminate/reduce the time required for fine adjustment for feeding one or several articles at a time to form a collection unit in the conventional apparatus, which requires considerable time. In the embodiment which includes collection hoppers with the discharge ports of the discharge means provided inside the hopper, the articles can be discharged at the same collection position to thereby reduce the time for collection without conveying the discharge means even if any satisfactory combination of ones of a plurality of discharge means is obtained.

I claim:

1. An apparatus for counting a small article, which sequentially feeds a set of small articles indefinite in number and smaller in number than target number, conveys the fed set of articles each in units of a set in a recirculating manner, combines at least two sets of articles during recirculating conveyance of the articles after the feeding of the articles to thereby obtain the target number of small articles, said apparatus comprising: feeding means for feeding said set of small articles indefinite in number and smaller in number than the target number; scattering means positioned below a discharge end of said feeding means for hindering a fall of the articles and scattering the articles in a passageway for the articles falling from the discharge end; and detecting means for detecting the articles which are scattered by said scattering means to thereby count a total number of falling articles.

2. An apparatus for counting a small article, which sequentially feeds sets of small articles indefinite in number and smaller in number than a target number, conveys the fed sets of articles in units of a set in a recirculating manner, combines at least two sets of articles during recirculating conveyance of the articles after the feeding of the articles to thereby obtain the target number of small articles, said device comprising feeding means for feeding a set of small articles indefinite in number and smaller in number than the target number; scattering means positioned below a discharge end of said feeding means in a passageway for the articles falling from the discharge end for hindering a fall of the articles and scattering the articles; and detecting means provided above and below said scattering means for detecting a total articles, which fall through the passageway for the articles, to thereby count the number of falling articles above and below said scattering means.

3. An apparatus for counting a small article, sequentially feeds sets of small articles indefinite in number and smaller in number than a target number, conveys the fed sets of articles in units of a set in a recirculating manner, combines at least two sets of articles during recirculating conveyance of the articles after the feeding of the articles to thereby obtain the target number of small articles, said device comprising feeding means for feeding a set of small articles indefinite in number and smaller in number than the target number; scattering means positioned below a discharge end of said feeding means for hindering a fall of the articles and scattering the articles in a passageway for the articles falling from the discharge end; first detecting means provided above said scattering means for detecting the articles and second detection means below said scattering means for detecting the articles which fall through the passageway for the articles; which fall through the passageway for the articles; and determining means for comparing a first number of articles detected by first detecting means above said scattering means and a second number of articles detected by the second detecting means below said scattering means to determine a number of articles which have fallen.

4. An apparatus for counting a small article, wherein when the number of articles counted by the first detecting means above said scattering means provided in the passageway of fall of the articles differs from the number of articles counted by the second detecting means below said scattering means, said determining means according to claim 3 determines that the largest one of said first number and said second number is the number of articles which have fallen.

5. An apparatus for collecting constant-quantity-of-articles, comprising: feeding means for feeding respective sets of articles less in total quantity than a target quantity; distributing means for conveying in a recirculating manner in units of a fed quantity the respective sets of articles fed by said feeding means and selectively distributing the respective sets of articles on a conveyance way; tracing means for tracing a respective current positions of sets of articles of the feed quantity fed by said feeding means together with information on respective quantities of sets of articles in correspondence to the conveyance of said distributing means; combining means for combining at least two of the sets of articles to obtain the target quantity of articles as a present collection unit; discharging means for discharging the combined sets of articles whose total quantity is the target quantity from said distributing means as the result of combination by the combining means; and accommodating means for temporarily accommodating the combined sets of articles, whose total quantity is the target quantity discharged by said discharging means.

* * * * *

UNITED STATES PATENT AND TRADEMARK OFFICE
CERTIFICATE OF CORRECTION

PATENT NO. : 5,444,749
DATED : August 22, 1995
INVENTOR(S) : Kunio Nambu

It is certified that error appears in the above-identified patent and that said letters patent is hereby corrected as shown below:

Column 33, line 26, delete "a set" and insert --sets--; after "articles" insert --each--;

line 27, after "than" insert --a--;

line 28, delete "set" (first occurrence) and insert --sets--; delete "each";

line 57, delete "a total" and insert --the--;

Column 34, line 1, delete "the" (second occurrence) and insert --a total--;

lines 17-20, delete "and second detection means below said scattering means for detecting the articles which fall through the passageway for the articles;"

line 21, after "articles;" insert --and second detection means below said scattering means for detecting the articles which fall through the passageway for the articles;--;

line 22, after "by" insert --the--;

line 44, delete "feed" and insert --fed--.

Signed and Sealed this

Twentieth Day of August, 1996

Attest:

BRUCE LEHMAN

*Attesting Officer*     *Commissioner of Patents and Trademarks*